(12) United States Patent
Wang et al.

(10) Patent No.: US 10,611,108 B2
(45) Date of Patent: Apr. 7, 2020

(54) YARDLESS LENS ASSEMBLIES AND MANUFACTURING METHODS

(71) Applicant: OmniVision Technologies, Inc., Santa Clara, CA (US)

(72) Inventors: Mao-Chin Wang, San Jose, CA (US); Chia-Yang Chang, Sunnyvale, CA (US); Shao-Fan Kao, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 439 days.

(21) Appl. No.: 15/282,095

(22) Filed: Sep. 30, 2016

(65) Prior Publication Data
US 2018/0095193 A1    Apr. 5, 2018

(51) Int. Cl.
*B29D 11/00* (2006.01)
*G02B 3/00* (2006.01)
*G02B 13/00* (2006.01)

(52) U.S. Cl.
CPC .... *B29D 11/00307* (2013.01); *B29D 11/0048* (2013.01); *B29D 11/00365* (2013.01); *B29D 11/00442* (2013.01); *G02B 3/005* (2013.01); *G02B 3/0031* (2013.01); *G02B 3/0056* (2013.01); *G02B 13/0085* (2013.01); *B29K 2995/0025* (2013.01); *B29K 2995/0026* (2013.01)

(58) Field of Classification Search
CPC ........ B29D 11/00365; B29D 11/00442; B29D 11/0048; B29D 11/00307; G02B 3/056; G02B 3/0031; G02B 3/005
See application file for complete search history.

(56) References Cited

U.S. PATENT DOCUMENTS

| 8,072,685 | B1 | 12/2011 | Wu et al. | |
|---|---|---|---|---|
| 8,630,042 | B2 | 1/2014 | Wu et al. | |
| 2013/0265459 | A1* | 10/2013 | Duparre | H04N 5/23238 348/218.1 |
| 2016/0070089 | A1 | 3/2016 | Kao et al. | |

FOREIGN PATENT DOCUMENTS

| TW | 201231258 A | 8/2012 |
|---|---|---|
| TW | 201610474 A | 3/2016 |

OTHER PUBLICATIONS

Taiwanese Patent Application No. 106130665, English translation of Office Action dated Oct. 16, 2018, 5 pages.

\* cited by examiner

*Primary Examiner* — Mathieu D Vargot
(74) *Attorney, Agent, or Firm* — Lathrop GPM LLP

(57) ABSTRACT

A wafer-level method for manufacturing yardless lenses includes (a) depositing light-curable lens resin between a mold and a first side of a transparent substrate, wherein the first side of the transparent substrate has an opaque coating with a plurality of apertures respectively aligned with a plurality of lens-shaped recesses of the mold, and (b) exposing a second side of the transparent substrate, facing away from the first side, to light, thereby illuminating portions of the light-curable lens resin aligned with the plurality of apertures to form a respective plurality of yardless lenses.

14 Claims, 12 Drawing Sheets

900

```
ON FIRST SIDE OF TRANSPARENT SUBSTRATE, FORM OPAQUE
COATING WITH PLURALITY OF APERTURES 702
              │
              ▼
┌─────────────────────────────────────────────────────────────────────┐
│ DEPOSIT LIGHT-CURABLE LENS RESIN BETWEEN MOLD AND FIRST SIDE OF     │
│ TRANSPARENT SUBSTRATE HAVING OPAQUE COATING WITH PLURALITY OF       │
│ APERTURES, WHEREIN RECESSES OF MOLD HAVE SMALLER TRANSVERSE         │
│ EXTENT THAN APERTURES                                               │
│ 910                                                                 │
│  ┌──────────────────────────┐  ┌──────────────────────────┐        │
│  │ PERFORM STEPS 712 AND    │  │ PERFORM STEPS 714 AND    │        │
│  │ 713 OF METHOD 700        │  │ 715 OF METHOD 700        │        │
│  │ 912                      │  │ 914                      │        │
│  └──────────────────────────┘  └──────────────────────────┘        │
│  ┌────────────────────────────────────────────────────────────┐    │
│  │ ACCOMMODATE EXCESS LENS RESIN IN OVERFLOW RECESSES AND     │    │
│  │ ALONG INTERFACE BETWEEN TRANSPARENT SUBSTRATE AND MOLD 916 │    │
│  │  ┌────────────────────────────────────────────────────┐    │   │
│  │  │ SUBSTANTIALLY COVER INTERFACE AT LEAST WITHIN      │    │   │
│  │  │ SIMPLY CONNECTED REGION THAT INCLUDES ALL          │    │   │
│  │  │ APERTURES 918                                      │    │   │
│  │  └────────────────────────────────────────────────────┘    │   │
│  └────────────────────────────────────────────────────────────┘    │
└─────────────────────────────────────────────────────────────────────┘
              │
              ▼
┌─────────────────────────────────────────────────────────────────────┐
│ EXPOSE SECOND SIDE OF TRANSPARENT SUBSTRATE TO LIGHT, THEREBY       │
│ ILLUMINATING PORTIONS OF LIGHT-CURABLE POLYMER ALIGNED WITH         │
│ PLURALITY OF APERTURES TO FORM RESPECTIVE PLURALITY OF              │
│ YARDLESS LENSES                                                     │
│ 920                                                                 │
│  ┌────────────────────────────────────────────────────────────┐    │
│  │ FORM THE YARDLESS LENSES SUCH THAT EACH YARDLESS LENS      │    │
│  │ INCLUDES A YARDLESS LENS ELEMENT ON A PEDESTAL 926         │    │
│  └────────────────────────────────────────────────────────────┘    │
│  ┌────────────────────────────────────────────────────────────┐    │
│  │ ABSORB LIGHT IN OPAQUE MOLD 722                            │    │
│  └────────────────────────────────────────────────────────────┘    │
└─────────────────────────────────────────────────────────────────────┘
              │
              ▼
PERFORM STEP 730 AND, OPTIONALLY, STEP 740 OF METHOD 700
930
```

FIG. 9

YARDLESS LENS ASSEMBLIES AND MANUFACTURING METHODS

BACKGROUND

Compact camera modules have become ubiquitous and are used in a wide range of applications ranging from consumer electronics, most notably smartphones, to medical systems, such as endoscopes, and automotive safety, e.g., back-up cameras and blind-spot detection. This development is a result of advances in camera manufacturing facilitating significant size and cost reduction. A key technology is wafer-level manufacturing of both lenses and image sensors. In the case of wafer-level lens manufacturing, a very large number of microlenses are molded on a single wafer, which is subsequently diced to produce individual lens modules. Since all the microlenses are molded in a single operation, significant cost savings result from forming a large number of microlenses on the same wafer. In one example, thousands of microlenses are molded on one side of the wafer in a single molding operation. A corresponding set of microlenses may be molded on the opposite side of the wafer in another single molding operation. The wafer is diced, optionally after bonding to one or more other lens wafers, to produce imaging objectives for use in compact camera modules. Wafer-level lens manufacturing is particularly well-suited for the production of microlenses and is, at least in terms of cost, generally superior to conventional single-lens casting.

In conventional wafer-level lens manufacturing, lens resin is deposited between a wafer substrate and a mold. The mold has both lens-shaped recesses for forming microlenses, and overflow recesses for accommodating excess lens resin. The overflow recesses are spaced apart from the lens-shaped recesses by a small distance. When the resin is cured, each microlens on the wafer is surrounded by a ring of cured excess lens resin, known in the art as "yard". This yard is spaced apart from the microlens by a short distance. Subsequently, when the lens wafer is diced, each lens module formed therefrom includes one or more of the microlenses as well as the yard surrounding each of these microlenses.

SUMMARY

In an embodiment, a wafer-level method for manufacturing yardless lenses includes depositing light-curable lens resin between a mold and a first side of a transparent substrate. The first side of the transparent substrate has an opaque coating with a plurality of apertures respectively aligned with a plurality of lens-shaped recesses of the mold. The method further includes exposing a second side of the transparent substrate, facing away from the first side, to light, thereby illuminating portions of the light-curable lens resin aligned with the plurality of apertures to form a respective plurality of yardless lenses.

In an embodiment, a yardless lens assembly includes a transparent substrate and an opaque coating deposited on the transparent substrate. The opaque coating forms an aperture on the transparent substrate. The yardless lens assembly further includes a yardless lens on the transparent substrate in the aperture.

In an embodiment, a yardless lens assembly includes a transparent substrate and an opaque coating deposited on the transparent substrate. The opaque coating forms a plurality of apertures on the transparent substrate. The yardless lens assembly further includes a plurality of yardless lenses on the transparent substrate in the plurality of apertures, respectively.

BRIEF DESCRIPTION OF THE DRAWINGS

FIG. 9 is a flowchart for a wafer-level method for manufacturing a yardless lens assembly, wherein each yardless lens includes a lens element on a pedestal integrally formed with the yardless lens element, according to an embodiment.

DETAILED DESCRIPTION OF THE EMBODIMENTS

Figure 1:
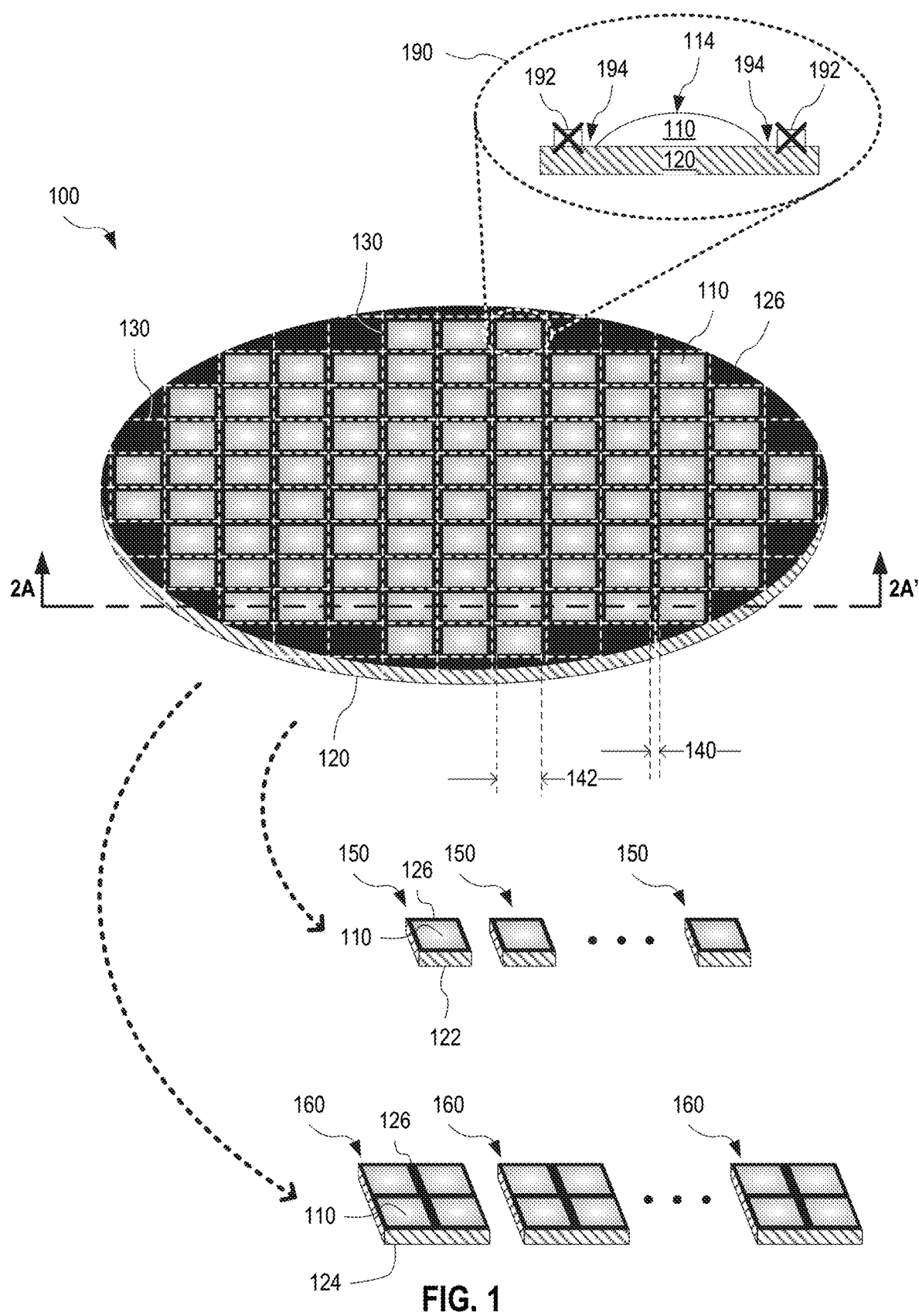
FIG. 1 illustrates a yardless lens wafer, according to an embodiment.

FIG. 1 illustrates one exemplary yardless lens wafer 100 formed using wafer-level methods disclosed herein. Yardless lens wafer 100 includes a transparent substrate 120 and a plurality of yardless lenses 110 formed thereon. Yardless lens wafer 100 may include tens, hundreds, or thousands, or even tens of thousands of yardless lenses 110. For clarity of illustration, not all yardless lenses 110 are labeled in FIG. 1.

Herein, a "yardless lens" refers to a wafer-level lens that is free of yard. A "yardless lens" is formed on a substrate and includes a lens element with an optical lens surface but is not surrounded, or even partly surrounded, by a raised rim of cured excess lens resin. This is illustrated in inset 190 which shows, in cross-sectional view, one yardless lens 110 on transparent substrate 120. As shown in inset 190, yardless lens 110 has an optical lens surface 114 but does not include and is not associated with a yard 192. In contrast, a conventional wafer-level lens includes (a) a lens element with an optical lens surface similar to optical lens surface 114 and (b) yard 192 at least partly surrounding the lens element, wherein yard 192 is separated from the lens element by a valley 194 that is not as tall as the lens element or yard 192. Although not shown in FIG. 1, yardless lens 110 may include some cured lens resin immediately surrounding optical lens surface 114, for example a shoulder of cured lens resin immediately adjacent optical lens surface 114. This is discussed in more detail below in reference to FIGS. 9-12.

Yardless lens wafer 100 is one example of yardless lens assemblies disclosed herein. Transparent substrate 120 is a glass substrate, for example. Yardless lenses 110 are composed of cured polymer resin.

Yardless lens wafer 100 further includes an opaque coating 126 deposited on the same side of transparent substrate 120 as yardless lenses 110. Opaque coating 126 forms an aperture around each yardless lens 110. Opaque coating 126 is for example made of black photoresist, or chromium or another metal. As will be discussed in further detail below in reference to FIGS. 6-10, yardless lenses 110 are formed on transparent substrate 120 after deposition onto transparent substrate 120 of opaque coating 126 with its plurality of apertures, and the apertures of opaque coating 126 then serve to (a) prevent formation of yard and (b) define the perimeter of each yardless lens 110 such that each yardless lens 110 spans the entire corresponding aperture of opaque coating 126. For clarity of illustration, opaque coating 126 is not shown in inset 190. Although FIG. 1 shown in FIG. 1 as extending to the perimeter of transparent substrate 120, opaque coating 126 may be absent from peripheral regions of transparent substrate 120 away from yardless lenses 110.

Although FIG. 1 shows yardless lenses 110 as having rectangular, non-square cross section, the cross section of yardless lenses 110 may be of a different shape, without departing from the scope hereof. For example, the cross section of yardless lenses 110 may be circular, elliptical, square, or have the shape of a cropped circle. Since image sensors generally are of non-square rectangular shape, a yardless lens of non-square rectangular cross section may be better matched to the shape of the image sensor. The presently disclosed wafer-level methods are well-suited for the manufacture of non-square rectangular yardless lenses. In contrast, prior art wafer-level methods with yard formation struggle to produce non-square rectangular lenses because the asymmetry leads to defects in the molding process.

Furthermore, although FIG. 1 shows optical lens surface 114 as being convex, optical lens surface 114 may be concave, convex, or a combination thereof, without departing from the scope hereof. In addition, optical lens surface 114 may be spheric or aspheric.

By virtue of the absence of yard, the shortest distance 140 between adjacent yardless lenses 110 may be as small as 500 microns, for example. In one example, distance 140 is in the range from 500 to 700 microns, for example 550 microns. Distance 140 is, for example, the distance required for dicing yardless lens wafer 100 along dicing lines 130 without damaging yardless lenses 110. The transverse extent 142 of each yardless lens 110 may be set according to the intended application of yardless lens 110. Transverse extent 142 may be a side length of a rectangular embodiment of yardless lens 110 or the diameter of a circular yardless lens 110. In one example, transverse extent 142 is in the range between one and several millimeters.

Yardless lens wafer 100 may be diced along some or all of dicing lines 130 to form a plurality of yardless lens assemblies 150 and/or a plurality of yardless lens assemblies 160. For clarity of illustration, not all dicing lines 130 are labeled in FIG. 1. Each yardless lens assembly 150 includes a portion 122 of transparent substrate 120 and, formed thereon, a single yardless lens 110 and a portion of opaque coating 126, such that opaque coating 126 forms an aperture around the single yardless lens 110. Yardless lens assembly 150 may be coupled with an image sensor to form a camera module. Each yardless lens assembly 160 includes a portion 124 of transparent substrate 120 and, formed thereon, an N×M array of yardless lenses 110 and a portion of opaque coating 126, wherein each of N and M are positive integers and N×M is greater than one. Yardless lens assembly 160 may be coupled with an image sensor to form an array camera module. In one embodiment of yardless lens assembly 160, the N×M array of yardless lenses 110 is a 2×1 or a 2×2 array of yardless lenses 110.

Figure 2A:
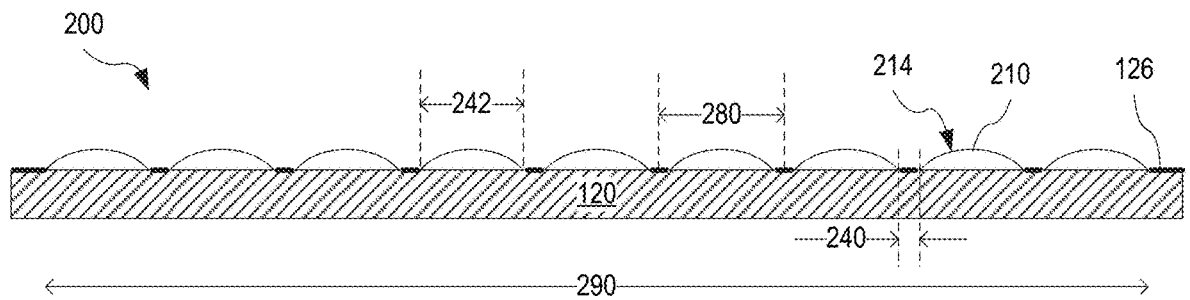
FIGS. 2A-C illustrate a yardless lens wafer including a plurality of rectangular yardless lens elements, according to an embodiment.
Figure 2B:
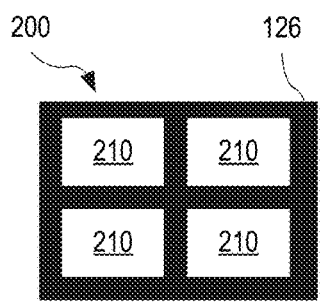
Figure 2C:
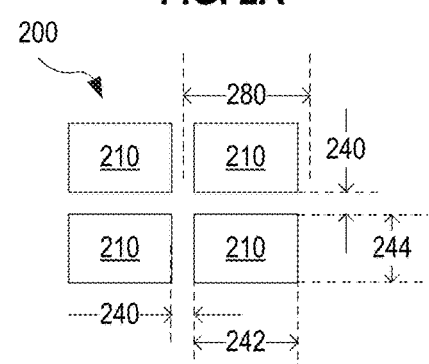

FIGS. 2A-C illustrate one exemplary yardless lens wafer 200 including a plurality of rectangular yardless lens elements 210. Yardless lens wafer 200 is an embodiment of yardless lens wafer 100, and rectangular yardless lenses 210 are embodiments of yardless lenses 110. Each rectangular yardless lens 210 has an optical lens surface 214, which is an embodiment of optical lens surface 114. FIG. 2A shows yardless lens wafer 200 in cross sectional side view taken along line 2A-2A' in FIG. 1. FIG. 2B is a top plan view of a portion of yardless lens wafer 200. FIG. 2C is a more detailed view of the layout of rectangular yardless lens elements 210 as seen in the top plan view of FIG. 2B. FIGS. 2A-C are best viewed together. For clarity of illustration, not all rectangular yardless lenses 210 are labeled in FIG. 2A.

In yardless lens wafer 200, opaque coating 126 forms rectangular apertures around each rectangular yardless lens 210. For clarity of illustration, not all instances of opaque coating 126 are labeled in FIG. 2A. Each rectangular yardless lens 210 has largest transverse extent 242 and transverse extent 244 in the dimension orthogonal to transverse extent 242. In one embodiment, transverse extent 244 is smaller than transverse extent 242, as shown in FIGS. 2B and 2C, such that each rectangular yardless lens 210 has non-square cross section. In another embodiment, transverse extent 244 is the same as transverse extent 242, such that the cross section of each rectangular yardless lens 210 is square.

The shortest distance between adjacent rectangular yardless lenses 210 is distance 240, which is an embodiment of distance 140. Distance 240 may be as small as 500 microns, for example. In one example, distance 240 is in the range from 500 to 700 microns, for example 550 microns. In the dimension associated with transverse extent 242, transverse extent 242 and distance 240 together define the number of rectangular yardless lenses 210 that may fit within a certain extent in this dimension. For example, nine rectangular yardless lenses 210 fits within length 290. When dicing yardless lens wafer 200 to form yardless lens assemblies similar to yardless lens assemblies 150, each such yardless lens assembly will have approximate extent 280 in the dimension parallel to length 290, wherein extent 280 is the sum of transverse extent 242 and distance 240 (or smaller if material is lost in the dicing process). Similarly, in the dimension orthogonal to length 290, transverse extent 244 and distance 240 together define both (a) the number of rectangular yardless lenses 210 that may fit within a certain extent in this dimension and (b) the extent in this dimension of yardless lens assemblies similar to yardless lens assembly 150. Without departing from the scope hereof, distance 240 in the vertical dimension in FIG. 2C may be different from distance 240 in the horizontal dimension in FIG. 2C.

Figure 2D:
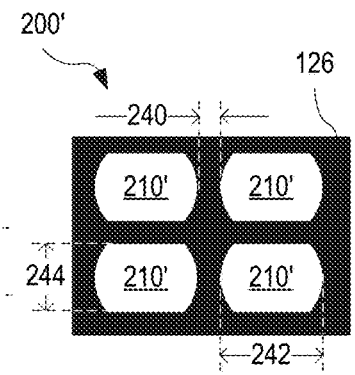
FIG. 2D illustrates a yardless lens wafer including a plurality of rectangular yardless lens elements each having cross section shaped as a cropped circle, according to an embodiment.

FIG. 2D is a top plan view of a yardless lens wafer 200', which is a modification of yardless lens wafer 200, wherein rectangular yardless lenses 210 are replaced by yardless lenses 210'. Each yardless lens 210' has a cross section that is shaped as a cropped circle. Each yardless lens 210' has transverse extents 242 and 244, and the shortest distance between adjacent yardless lenses 210' is distance 240.

Figure 3A:
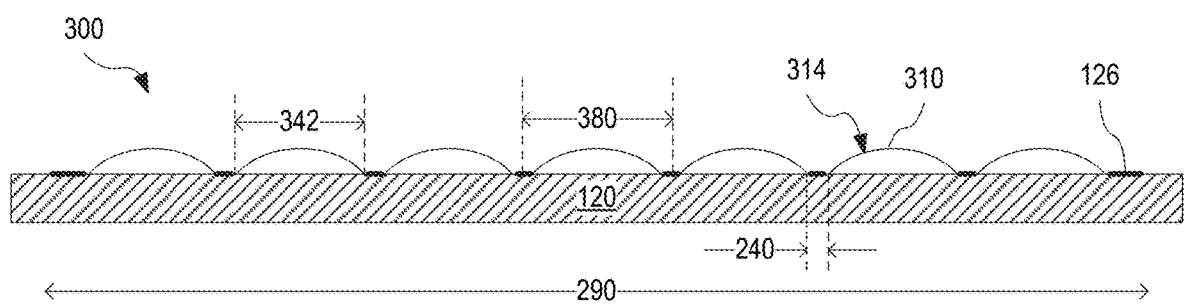
FIGS. 3A-C illustrate one exemplary yardless lens wafer including a plurality of circular yardless lens elements, according to an embodiment.
Figure 3B:
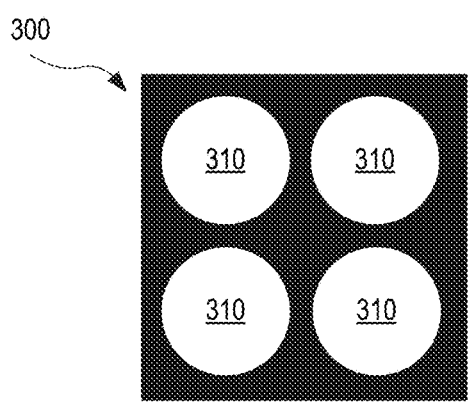
Figure 3C:
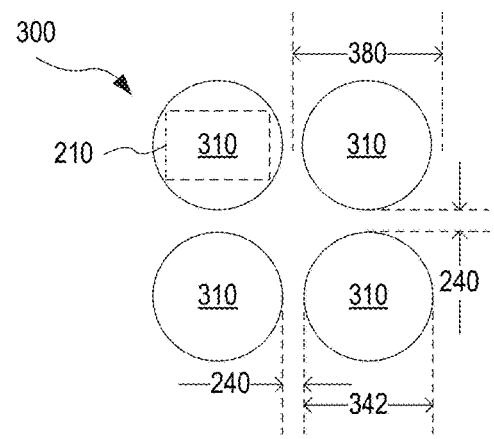

FIGS. 3A-C illustrate one exemplary yardless lens wafer 300 including a plurality of circular yardless lens elements 310. Yardless lens wafer 300 is an embodiment of yardless lens wafer 100, which is similar to yardless lens wafer 200 except for rectangular yardless lenses 210 being replaced by circular yardless lenses 310. FIG. 3A shows yardless lens wafer 300 in cross sectional side view taken along line 2A-2A' in FIG. 1. FIG. 3B is a top plan view of a portion of yardless lens wafer 300. FIG. 3C is a more detailed view of the layout of circular yardless lens elements 310 as seen in the top plan view of FIG. 3B. FIGS. 3A-C are best viewed together. For clarity of illustration, not all circular yardless lenses 310 are labeled in FIG. 3A. Likewise, not all instances of opaque coating 126 are labeled in FIG. 3A.

The shortest distance between circular yardless lenses 310 is distance 240. However, in order to encompass the same optically active area as rectangular yardless lens 210, each circular yardless lens 310 has diameter 342 greater than both transverse extent 242 and transverse extent 244. Therefore, each circular yardless lens 310 occupies a larger area of transparent substrate 120 than rectangular yardless lens 210. Specifically, when requiring that the shortest distance between adjacent circular yardless lenses 310 is distance 240, each circular yardless lens 310 will require a square area with side length 380, wherein side length 380 is the sum of diameter 342 and distance 240. As a result, a yardless wafer 300 of same size as yardless wafer 200 will accommodate fewer yardless lenses. For example, only seven circular yardless lenses 310 fit within length 290.

Figure 4A:
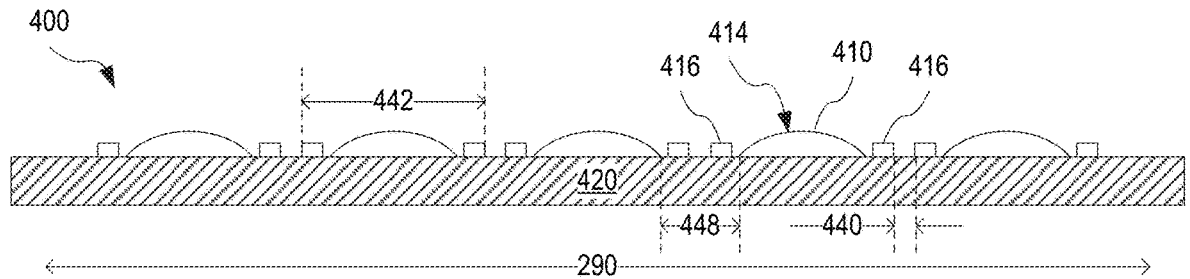
FIGS. 4A and 4B show a prior art lens wafer including a plurality of prior art wafer-level lenses with yard.
Figure 4B:
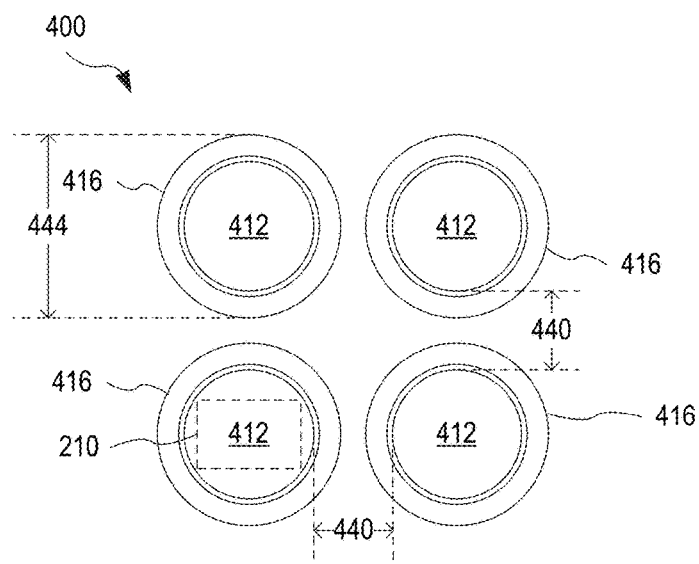

FIGS. 4A and 4B show a prior art lens wafer 400 including a plurality of prior art wafer-level lenses 410. FIG. 4A shows lens wafer 400 in cross sectional side view similar to that of FIG. 2A. FIG. 4B shows the layout of lenses 410 in a top plan view similar to that of FIG. 2C. FIGS. 4A and 4B are best viewed together.

Lens wafer 400 includes a substrate 420 and the plurality of conventional, circular wafer-level lenses 410 formed thereon. Each lens 410 has an optical lens surface 414 and is surrounded by a yard 416. Lens 410 may be of size similar to that of circular yardless lens 310, so as to encompass an optical area similar to that of circular yardless lens 310. However, the diameter 444 of yard 416 associated with each lens 410 significantly exceeds the diameter of lens 410. The shortest distance between yard 416 associated with adjacent lenses 410 is distance 440, and the shortest distance between adjacent lenses 410 is distance 448. In one example, distance 440 is similar to distance 240 because distance 440 must be sufficient to accommodate dicing of lens wafer 400. Since distance 448 needs to accommodate both distance 440 and two instances of yard 416, distance 448 is significantly larger than distance 440. In one example, distance 440 is similar to distance 240 because distance 440 must be sufficient to accommodate dicing of lens wafer 400, such that distance 442 between adjacent lenses 410 of lens wafer 400 is significantly greater than distance 240 between adjacent rectangular yardless lenses 210 of yardless lens wafer 200 or between adjacent circular yardless lenses 310 of yardless lens wafer 300. Consequently, the square area required by each prior art lens 410 significantly exceeds the square area required by each rectangular yardless lenses 210 or by each circular yardless lenses 310. As shown in FIG. 4A, only five lenses fit within length 290.

Figure 5:
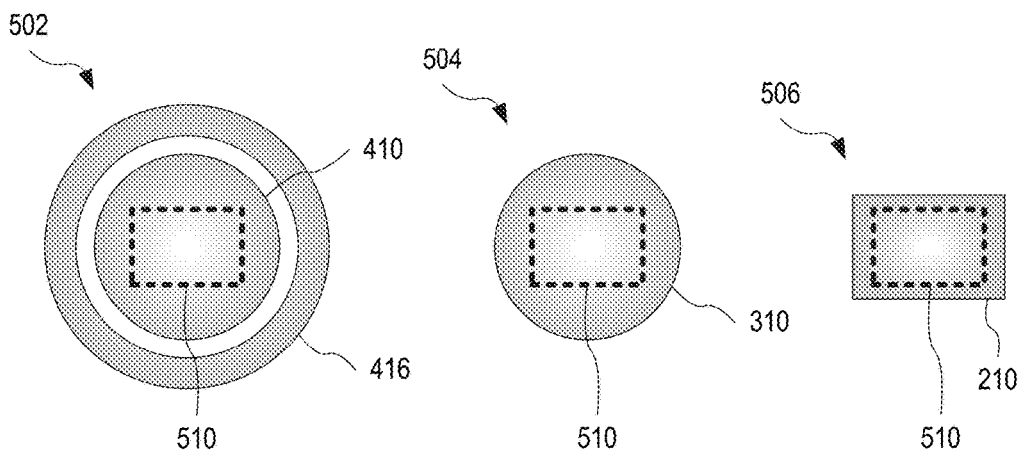
FIG. 5 illustrates improved match between yardless lenses disclosed herein and conventional non-square rectangular image sensors, according to embodiments.

FIG. 5 illustrates the improved match between yardless lenses disclosed herein and conventional non-square rectangular image sensors. Diagram 502 shows prior art lens 410, with yard 416, sized to image a scene onto a non-square rectangular image sensor 510. The view in diagram 502 is along the optical axis of prior art lens 410. Diagram 504 shows, in the same view as used in diagram 502, circular yardless lens 310 sized to image the scene onto image sensor 510. Circular yardless lens 310 and prior art lens 410 may have similar diameter but circular yardless lens 310 has no yard associated therewith. Thus, circular yardless lens 310 is significantly smaller and better matched to image sensor 510, as compared to prior art lens 410 with yard 416. Diagram 506 shows rectangular yardless lens 210, in the same view as used in diagrams 502 and 504, sized to image the scene onto image sensor 510. Rectangular yardless lens 210 may provide imaging of similar quality as circular yardless lens 310 since the more peripheral portions of circular yardless lens 310, especially in the vertical dimension in FIG. 5, contribute only little or not at all to the image formed on image sensor 510.

As a result, when the goal is to produce wafer-level lenses for imaging a scene onto a non-square rectangular image sensor, the highest yield per wafer may be achieved for rectangular yardless lens 210, while at least substantially maintaining the imaging quality. Even circular yardless lens 310 represents a significant improvement over prior art lens 410 with yard 416.

Figure 6:
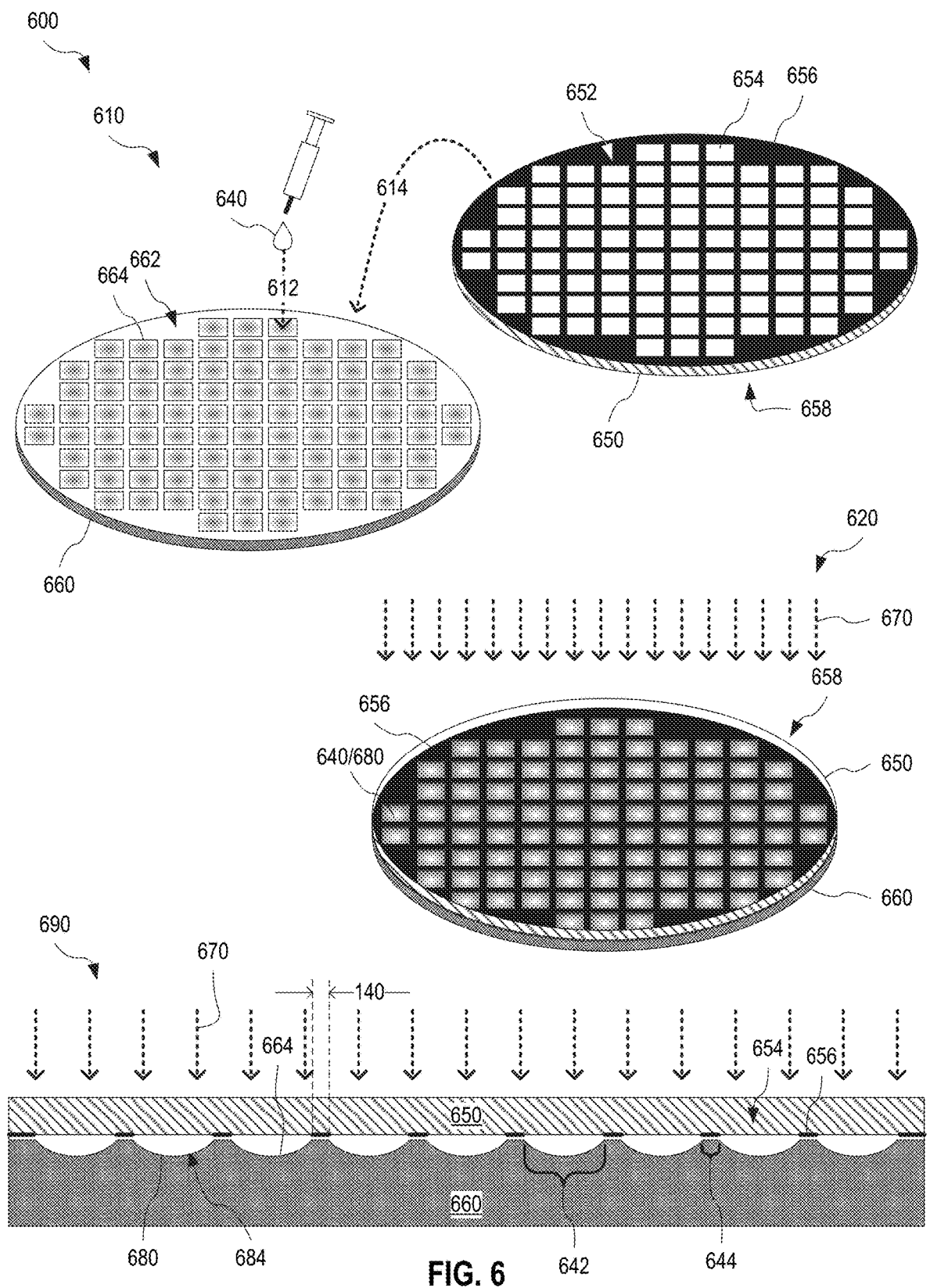
FIG. 6 illustrates a wafer-level method for manufacturing a yardless lens assembly, according to an embodiment.

FIG. 6 illustrates one exemplary wafer-level method 600 for manufacturing a yardless lens assembly. Method 600 may be used in the manufacture of yardless lens wafer 100 as well as yardless lens assemblies 150 and 160.

In a step 610, a light-curable lens resin 640 is deposited between a mold 660 and a first side 652 of a transparent substrate 650. Side 652 of transparent substrate 650 has an opaque coating 656 deposited thereon. Opaque coating 656 forms a plurality of apertures 654 respectively aligned with a plurality of lens-shaped recesses 664 of mold 660. For clarity of illustration, not all apertures 654 and not all lens-shaped recesses 664 are labeled in FIG. 6. Light-curable lens resin 640 is for example an ultraviolet (uv)-light-curable resin, such as a uv-sensitive epoxy.

In one embodiment, step 610 includes steps 612 and 614. Step 612 deposits lens resin 640 on a side 662 of mold 660, associated with lens-shaped recesses 664. In one example of step 612, lens resin 640 is deposited at least in lens-shaped recesses 664. Next, in step 614, the mold is closed by placing side 652 of transparent substrate 650 against side 662 of mold 660. Lens resin 640 may occupy all or part of the interface between side 652 of transparent substrate 650 and side 662 of mold 660, such that sides 652 and 662 are not in direct contact with each other. In step 614 mold 660 may be held with side 662 facing up when side 652 of transparent substrate 650 is placed against side 662, or mold 660 may be oriented with side 662 facing down when side 652 of transparent substrate 650 is placed against side 662. In an alternative embodiment of step 610, not shown in FIG. 6, lens resin 640 is deposited onto side 652 of transparent substrate 650 before placing side 652 against side 662 of mold 660, with side 652 facing either up or down.

A subsequent step 620 exposes side 658 of transparent substrate 650 to light 670. Side 658 is opposite side 652. Light 670 is in a wavelength range to which lens resin 640 is sensitive, such that portions of lens resin 640 exposed to light 670 are cured. Transparent substrate 650 transmits light 670, but opaque coating 656 transmits only portions of light 670 incident on apertures 654. As a result, only portions of lens resin 640 aligned with apertures 654 are cured. These exposed portions of lens resin 640 are aligned with lens-shaped recesses 664 and the exposure to light 670 results in the formation of a plurality of yardless lenses 680, wherein each yardless lens 680 substantially spans the corresponding aperture 654.

Diagram 690 is a cross sectional view illustrating step 620 in further detail. Light 670 incident on side 658 of transparent substrate 650 is transmitted by apertures 654 to illuminate portions 642 of lens resin 640 respectively aligned with apertures 654. However, opaque coating 656 blocks (by absorption and/or reflection) light propagating in the direction toward portions 644 of lens resin 640 not aligned with apertures 654. Thus, step 620 cures only portions 642 of lens resin 640. Portions 642 are aligned with lens-shaped recesses 664, such that step 620 cures yardless lenses 680. For clarity of illustration, not all instances of opaque coating 656 are labeled in diagram 690. Yardless lenses 680 are yardless because lens resin 640 located away from apertures 654 is not cured in step 620. Each yardless lens 680 has an optical lens surface 684 defined by a respective lens-shaped recess 664. The shortest distance between adjacent yardless lenses 680 is distance 140, which is defined by the shortest width of opaque coating 656 between adjacent apertures 654.

The positioning of opaque coating 656 on side 652 of transparent substrate 650 places opaque coating 656 as close to lens resin 640 as possible, namely at the interface between side 652 of transparent substrate 650 and side 662 of mold 660. This positioning provides the most accurate delineation between cured portions 642 and uncured portions 644 of lens resin 640, which in turn provides the most accurate definition of the perimeter of yardless lenses 680. If, in contrast, opaque coating 656 (or a similar construct) with apertures 654 was placed at a greater distance from the interface between mold 660 and transparent substrate 650, such as above side 658 of transparent substrate 650, imperfections such as deviations from perfect collimation of light 670 and/or scattering of light 670 would degrade the delineation between cured portions 642 and uncured portions 644 of lens resin 640. For example, light propagating at an angle of 2 degrees to normal incidence on a 250 micron thick transparent substrate will exhibit a transverse shift of 9 microns during propagating through the transparent substrate. Light propagating at an angle of 2 degrees to normal incidence on a 1 millimeter thick transparent substrate will exhibit a transverse shift of 34 microns during propagating through the transparent substrate. To compensate for this degraded delineation, distance 140 would have to be increased to maintain the minimum required separation between the yardless lenses. Thus, the present positioning of opaque coating 656 at the interface between transparent substrate 650 and mold 660 provides optimal definition of yardless lenses 680, which in turn facilitates the highest yield per wafer.

Step 620 may be followed by a step of removing uncured portions 644 of lens resin 640 to form a lens wafer, such as yardless lens wafer 100, including transparent substrate 650, opaque coating 656, and a plurality of yardless lenses 680 in respective apertures 654 of opaque coating 656. Transparent substrate 120 is an example of transparent substrate 650, opaque coating 126 is an example of opaque coating 656, and yardless lenses 110 are examples of yardless lenses 680. Furthermore, method 600 may be extended to singulate yardless single-lens assemblies or yardless lens array assemblies as discussed above in reference to FIG. 1 for yardless lens assemblies 150 and 160.

Although FIG. 6 shows apertures 654, lens-shaped recesses 664, and yardless lenses 680 as having rectangular, non-square cross section, the cross section of apertures 654, lens-shaped recesses 664, and yardless lenses 680 may be of a different shape, without departing from the scope hereof. For example, the cross section of apertures 654, lens-shaped recesses 664, and yardless lenses 680 may be circular, elliptical, square, or have the shape of a cropped circle.

Figure 7:
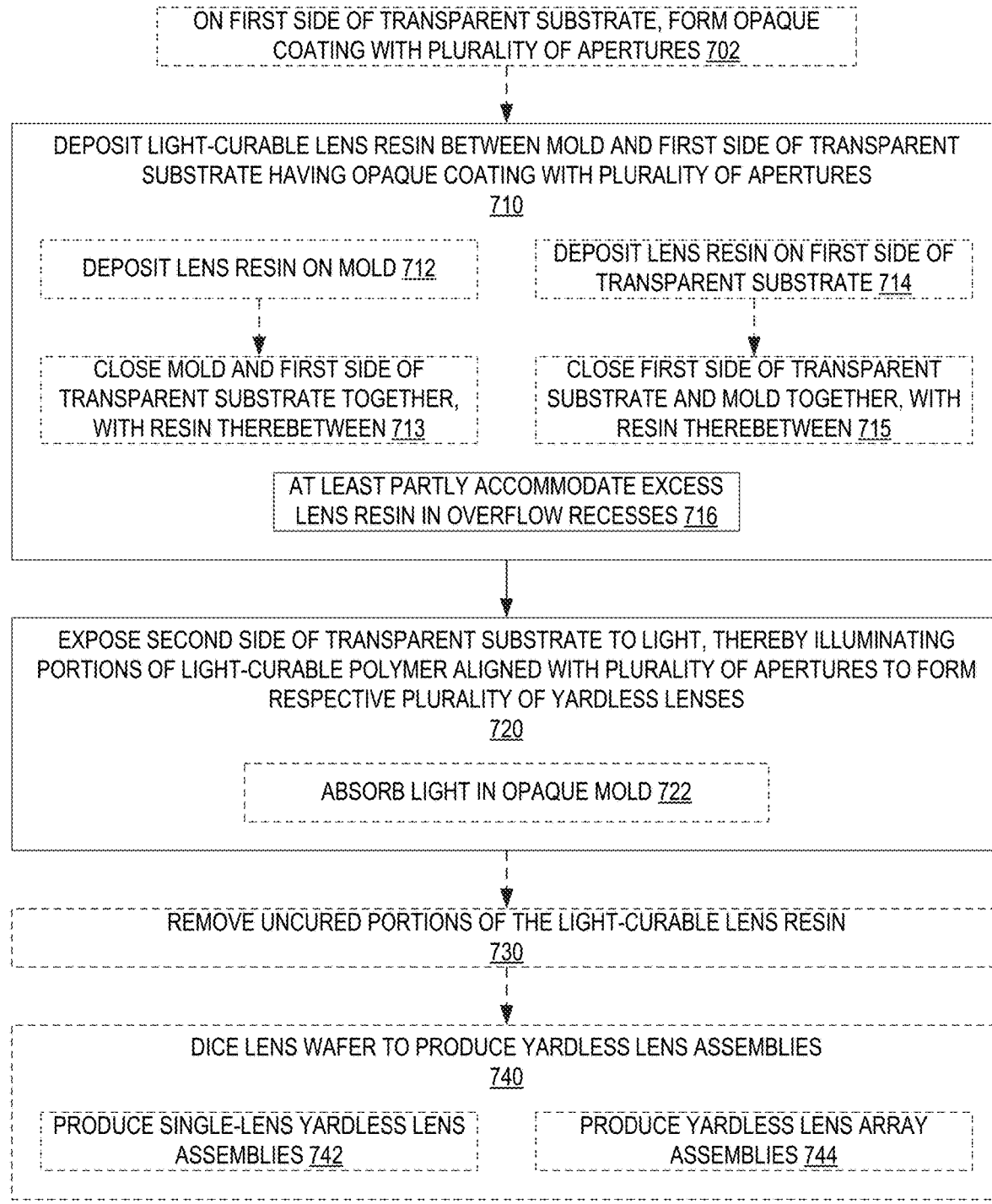
FIG. 7 is a flowchart for another wafer-level method for manufacturing a yardless lens assembly, according to an embodiment.
Figure 8A:
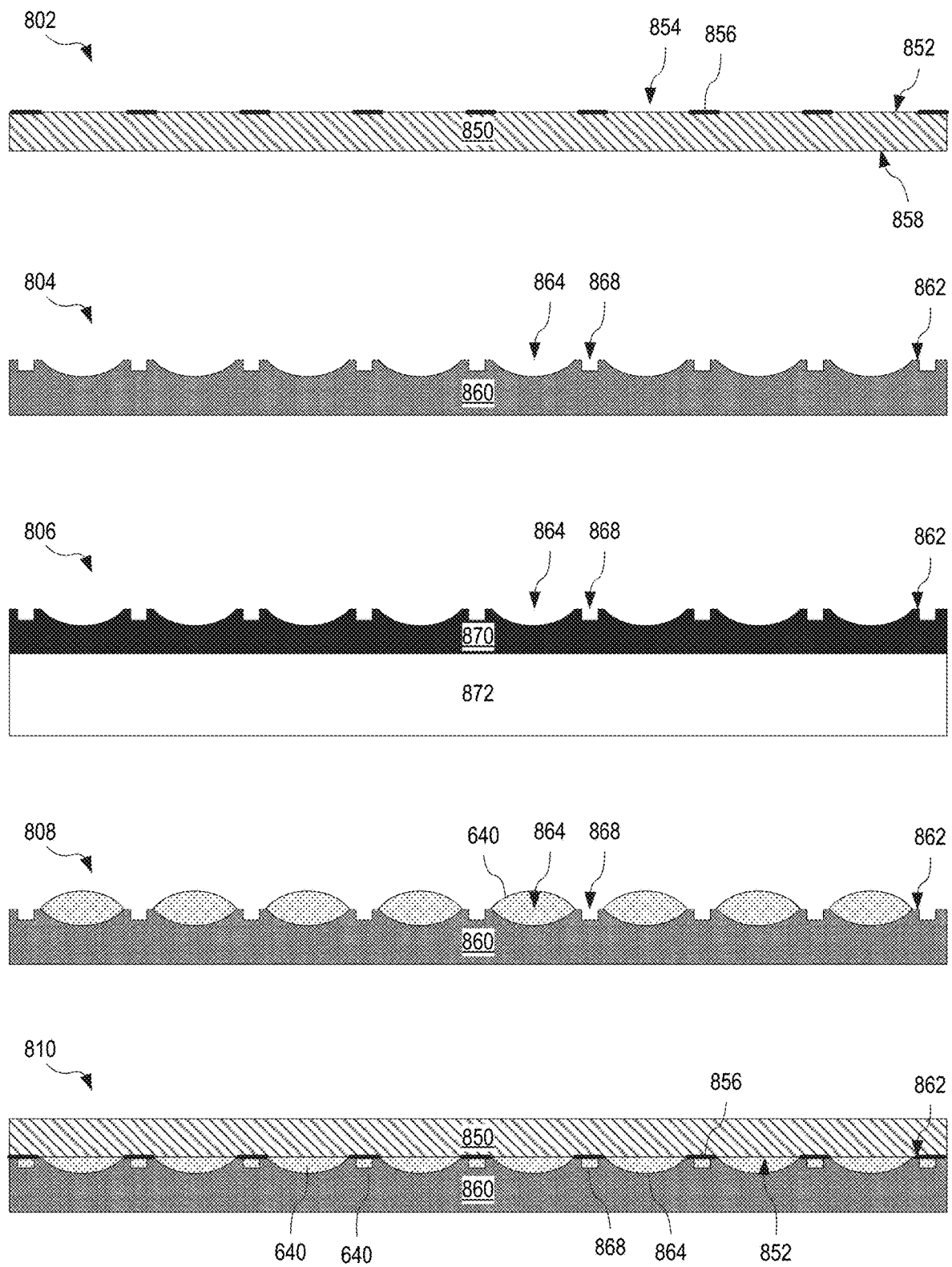
FIGS. 8A and 8B illustrate certain steps of the method of FIG. 7.
Figure 8B:
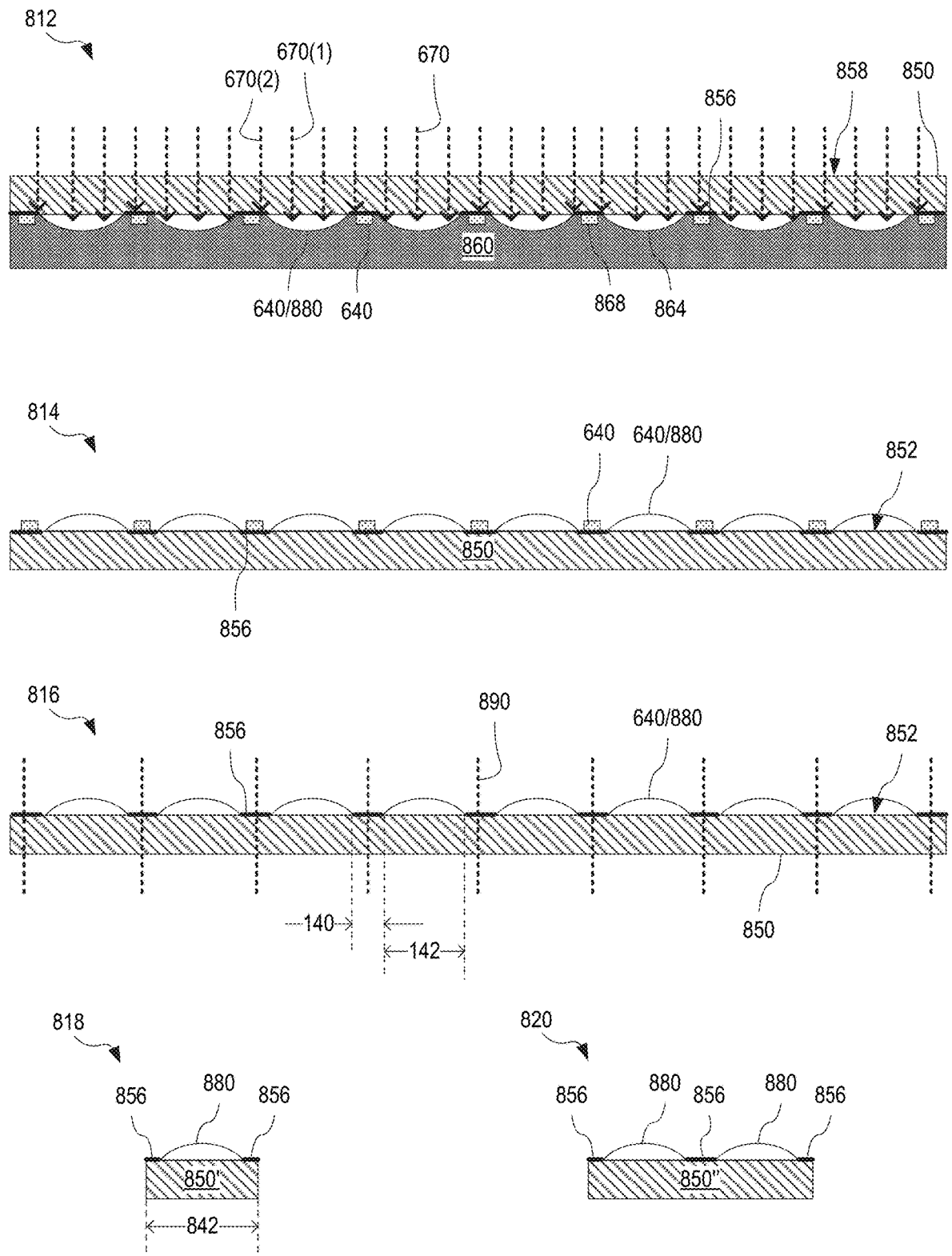

FIG. 7 is a flowchart for another exemplary wafer-level method 700 for manufacturing a yardless lens assembly. Method 700 is an embodiment of method 600 and may be used to manufacture yardless lens wafer 100. Certain embodiments of method 700 may further be used to manufacture either or both of yardless lens assemblies 150 and yardless lens assemblies 160. FIGS. 8A and 8B illustrate certain steps of method 700. FIGS. 7, 8A, and 8B are best viewed together. For clarity of illustration, not all instances of identical elements are labeled in FIGS. 8A and 8B.

A step 710 deposits light-curable lens resin between a mold and a first side of a transparent substrate. The first side of the transparent substrate has an opaque coating with a plurality of apertures. Step 710 is an embodiment of step 610. In one embodiment, step 710 includes steps 712 and 713. Step 712 deposits the lens resin on the mold, and step 714 closes the first side of the substrate and the mold against each other with the lens resin therebetween. In another embodiment, step 710 includes steps 714 and 715. Step 714 deposits the lens resin on the first side of the transparent substrate, and step 715 closes the mold and the first side of the substrate against each other with the lens resin therebetween. Step 710 includes a step 716 of at least partly accommodating excess lens resin in overflow recesses of the mold.

FIG. 8A shows a plurality of diagrams which illustrate 710 by example. Diagrams 802, 804, and 806 show exemplary structures that step 710 may utilize. Diagrams 808 and 810 together illustrate one exemplary embodiment of step 710 based on the structures of diagrams 802, 804, and 806.

Diagram 802 shows a transparent substrate 850 having an opaque coating 856 deposited on a side 852 thereof. Opaque coating 856 forms a plurality of apertures 854. Diagram 804 shows a mold 860 having a plurality of lens-shaped recesses 864 and overflow recesses 868 formed in a side 862 of mold 860. Each lens-shaped recess 864 corresponds to one or apertures 854. Overflow recesses 868 are formed between lens-shaped recesses 864 and serve to accommodate excess lens resin. Overflow recesses 868 may be connected and, for example, form one connected recess structure that surrounds each lens-shaped recess 864. Diagram 806 shows one embodiment of mold 860, wherein mold 860 is implemented as an opaque polymer mold 870 supported by a rigid backer 872. Opaque polymer mold 870 implements side 862, lens-shaped recesses 864, and overflow recesses 868. Opaque polymer mold is for example made from polydimethylsiloxane (PDMS) or another silicone material. Rigid backer 872 is for example a glass substrate, and serves to provide structural rigidity for opaque polymer mold 870. Opaque polymer mold 870 absorbs, or at least partly absorbs, light incident thereon and at least reduces backscattering of such light.

In diagram 808, lens resin 640 is deposited on side 862 of mold 860 as part of step 710. Diagram 808 shows lens resin 640 as being disposed exclusively in lens-shaped recesses 864. However, without departing from the scope hereof, lens resin 640 may be deposited on other surfaces of side 862 in addition to or instead of lens-shaped recesses 864. For example, step 710 may deposit lens resin 640 along all or the majority of side 862. Diagram 810 shows side 852 of transparent substrate 850 and side 862 of mold 860 being closed against each other with lens resin 640 therebetween. Sides 852 and 862 may be in direct contact with each other, or may be separated from each other by a thin layer of lens resin 640. Step 710 thereby fills lens-shaped recesses 864 with lens resin, and overflow recesses 868 accommodate at least a portion of excess lens resin 640 (step 716). Step 716 and overflow recesses 868 allow for deposition, in step 710, of excess lens resin 640 between transparent substrate 850 and mold 860 to ensure that lens-shaped recesses 864 are completely filled with lens resin 640. Additional excess lens resin 640 may exist at the interface between sides 852 and 862 away from both lens-shaped recesses 864 and overflow recesses 868. In one embodiment, excess lens resin 640 exists along the entire interface between sides 852 and 862, at least within a simply connected region that encompasses all lens-shaped recesses 864 and apertures 854. Herein, a "simply connected region" refers to a region within which any closed loop may be continuously shrunk to a point without leaving the region. Loosely stated, a simply connected region is free of holes. Diagrams 808 and 810 illustrate an embodiment of step 710, which includes steps 712, 713, and 716.

Without departing from the scope hereof, in step 710, mold 860 may be held with side 862 facing up when side 852 of transparent substrate 850 is placed against side 662 (as shown in diagram 810), or mold 860 may be oriented with side 862 facing down when side 852 of transparent substrate 850 is placed against side 862. In an alternative embodiment of step 710, not shown in diagrams 808 and 810, lens resin 640 is deposited onto side 852 of transparent substrate 850 before placing side 852 against side 862 of mold 860, with side 852 facing either up or down. This embodiment of step 710 includes steps 714, 715, and 716.

Step 710 may be preceded by a step 702 of forming the opaque coating on the first side of the transparent substrate. In one example, step 702 forms opaque coating 856 on side 852 of transparent substrate 850.

A step 720 exposes a second side of the transparent substrate, facing opposite the first side, to light. Step 720 thereby illuminates portions of the lens resin aligned with the apertures of the opaque coating on the first side of the transparent substrate, so as to form a plurality of yardless lenses by curing these portions of the lens resin. Step 720 is an embodiment of step 620. The yardless lenses formed in step 720 may have cross section that is circular, non-square rectangular, square, or shaped as a cropped circle, for example.

Diagram 812 of FIG. 8B illustrates one example of step 720. In diagram 812, step 720 exposes side 858 of transparent substrate 850 to light 670. Side 858 is opposite side 852. Opaque coating 856 blocks (by absorption and/or reflection) portions of light 670 incident thereon, such that light 670 illuminates only portions of lens resin 640 aligned with apertures 854. Step 720 thereby forms a plurality of yardless lenses 880. Yardless lenses 880 are embodiments of yardless lenses 680. The cross section of yardless lenses 880 may be circular, non-square rectangular, square, or shaped as a cropped circle, for example.

In certain embodiments, step 720 includes a step 722 of absorbing light in an opaque mold. Step 722 may thereby eliminate or at least reduce the amount of light backscattered onto the lens resin deposited between the mold and the transparent substrate. This may further improve the accuracy of delineation between cured and uncured portions of the lens resin, so as to further improve the accuracy of the definition of the perimeter of the yardless lenses. In one example of this embodiment, mold 860 is implemented as opaque polymer mold 870 with rigid backer 872, and portions of light 670 reaching opaque polymer mold 870 are at least partly absorbed by opaque polymer mold 870.

Method 700 may include a step 730 of removing uncured portions of the lens resin, to form a yardless lens wafer. Diagrams 814 and 816 illustrate one example of step 730, wherein mold 860 is removed from transparent substrate 850, and subsequently uncured lens resin 640 on side 852 of transparent substrate 850 are dissolved using an appropriate solvent. Step 730 includes dissolving uncured lens resin originally located in the overflow recesses, such as lens resin 640 deposited in or forced into overflow recesses 868 in step 710. Diagram 816 shows one exemplary lens wafer, resulting from step 730, which includes transparent substrate 850, opaque coating 856, and yardless lenses 880 in apertures 854 of opaque coating 856. The shortest distance between adjacent yardless lenses 880 is distance 140, and each yardless lens has transverse extent 142.

Method 700 may further include a step 740 of dicing the yardless lens wafer formed in step 730 to produce yardless lens assemblies. In one example of step 740, the yardless lens wafer of diagram 816 is diced along some or all of dicing lines 890 to form yardless single-lens assemblies 818 (see FIG. 8B) and/or yardless lens array assemblies 820 (see FIG. 8B). Each yardless single-lens assembly 818 includes a portion 850' of transparent substrate 850, a single yardless lens 880 on portion 850' and a portion of opaque coating 856 surrounding yardless lens 880. Yardless single-lens assembly 818 is similar to yardless lens assembly 150. Yardless single-lens assembly 818 has transverse extent 842. Transverse extent 842 is the sum of (a) transverse extent 142 of transparent substrate 850 and (b) distance 140 (or smaller if material is lost in the dicing process). Each yardless lens array assembly 820 includes a portion 850" of transparent substrate 850, an M×N array of yardless lenses 880 on portion 850" and a portion of opaque coating 856 surrounding each of yardless lens 880 and spanning surface portion 850" between yardless lenses 880, wherein M and N are positive integers and M×N is greater than one. Yardless lens array assembly 820 is similar to yardless lens array assembly 160.

Figure 10:
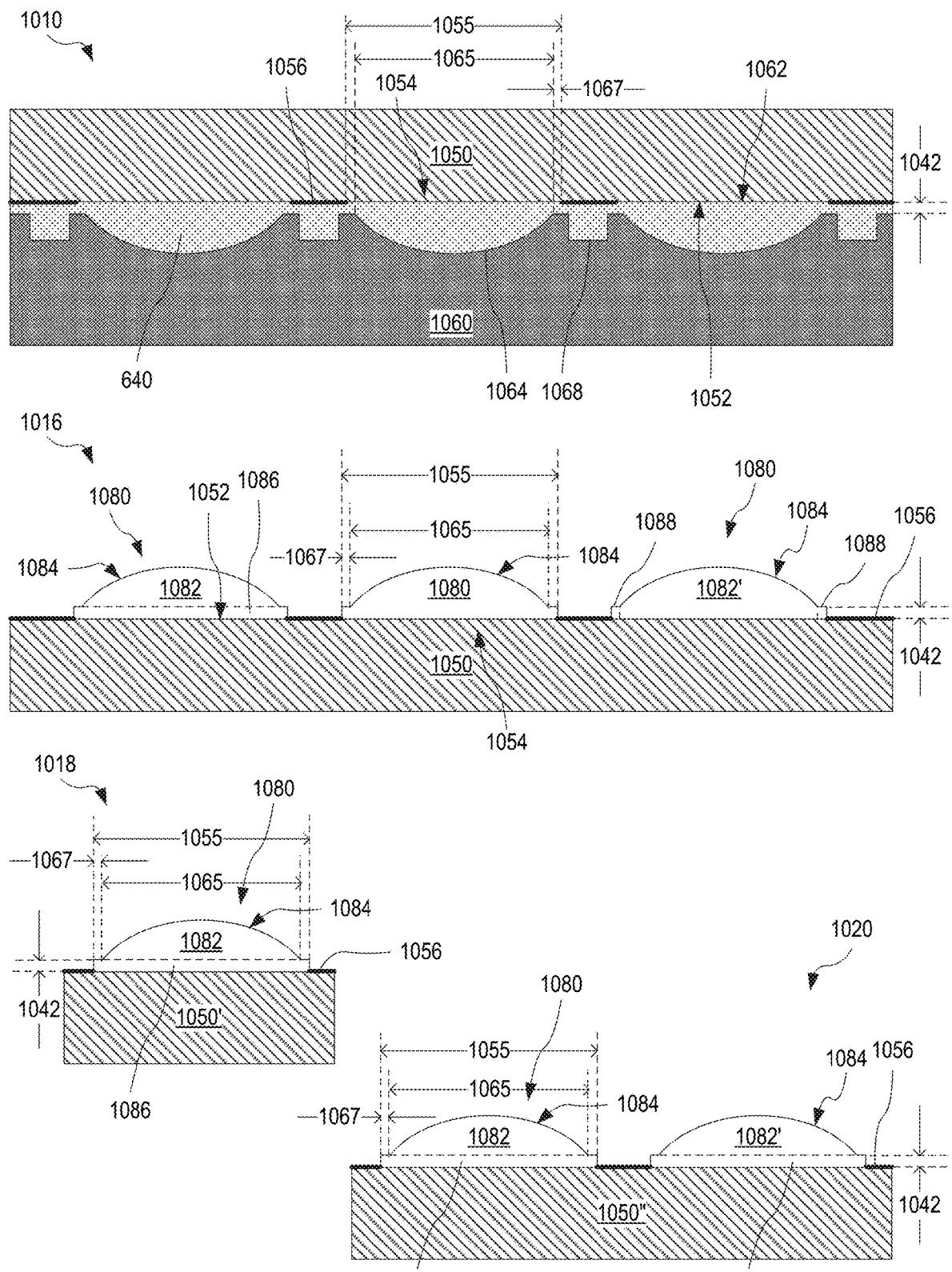
FIG. 10 illustrates certain steps of the method of FIG. 9.

FIG. 9 is a flowchart for one exemplary wafer-level method 900 for manufacturing a yardless lens assembly, wherein each yardless lens includes a lens element on a pedestal integrally formed with the yardless lens element. Method 900 is an embodiment of method 700 and may be used to manufacture yardless lens wafer 100. Certain embodiments of method 900 may further be used to manufacture embodiments of either or both of yardless lens assemblies 818 and yardless lens assemblies 820. FIG. 10 illustrates certain steps of method 900. FIGS. 9 and 10 are best viewed together. For clarity of illustration, not all instances of identical elements are labeled in FIG. 10.

Method 900 includes a step 910 of depositing light-curable lens resin between a mold and a first side of a transparent substrate. The mold has a plurality of lens-shaped recesses and the first side of the transparent substrate has a respective plurality of apertures aligned with the lens-shaped recesses of the mold. For each corresponding pair of one of the lens-shaped recesses and one of the apertures, the transverse extent of the lens-shaped recess is smaller than the transverse extent of the aperture. Step 910 is an embodiment of step 710. In one embodiment, step 910 includes a step 912 of performing steps 712 and 713 of method 700. In another embodiment, step 910 includes a step 914 of performing steps 714 and 715 of method 700. Step 910 includes a step 916 of at least partly accommodating excess lens resin in overflow recesses of the mold and along the interface between the mold and the transparent substrate. In certain embodiments, step 916 includes a step 918 of substantially covering the interface between the mold and the transparent substrate with lens resin, at least within a simply connected region of the interface including all apertures of the opaque coating on the first side of the transparent substrate.

Diagram 1010 of FIG. 10 provides an exemplary illustration of step 916. In the example of diagram 1010, lens resin 640 is deposited between side 1052 of a transparent substrate 1050 and side 1062 of a mold 1060. Side 1052 of transparent substrate 1050 has an opaque coating 1056 deposited thereon, and opaque coating 1056 forms a plurality of apertures 1054. Transparent substrate 1050 is an embodiment of transparent substrate 850, opaque coating 1056 is an embodiment of opaque coating 856, and apertures 1054 are embodiments of apertures 854. Side 1062 of mold 1060 has a plurality of lens-shaped recesses 1064 and overflow recesses 1068. Mold 1060 is an embodiment of mold 860, lens-shaped recesses 1064 are embodiments of lens-shaped recesses 864, and overflow recesses 1068 are embodiments of overflow recesses 868. Mold 1060 may be implemented as an opaque polymer mold with a rigid backer, as discussed above for mold 860 in reference to FIG. 8A. Overflow recesses 1068 may be connected and, for example, form one connected recess structure that surrounds each lens-shaped recess 1064. Each lens-shaped recess 1064 has transverse extent 1065, and each aperture 1054 has corresponding transverse extent 1055. Transverse extent 1065 is smaller than transverse extent 1055, in any direction in the plane of the interface between mold 1060 and transparent substrate 1050. The shortest distance from the perimeter of each lens-shaped recess 1064 to opaque coating 1056, projected onto the plane of the interface between mold 1060 and transparent substrate 1050, is distance 1067. In one example, distance 1067 is in the range from 50 to 250 microns. The role of distance 1067 will be addressed below in reference to a subsequent step 920. In step 910, excess lens resin 640 is accommodate along at least a portion of the interface between mold 1060 and transparent substrate 1050, such that side 1052 of transparent substrate 1050 is a distance 1042 away from side 1062 of mold 1060. In one example, distance 1042 is less than 10 microns. In another example, distance 1042 is in the range from 3 to 5 microns.

In subsequent step 920, method 900 exposes a second side of the transparent substrate, facing opposite the first side, to light. Step 920 thereby illuminates portions of the lens resin aligned with the apertures of the opaque coating on the first side of the transparent substrate, so as to form a plurality of yardless lenses by curing these portions of the lens resin. Step 920 is an embodiment of step 720 and includes a step 926 of forming the yardless lenses such that each yardless lens includes a yardless lens element on a pedestal. The yardless lenses formed in step 920 may have cross section that is circular, non-square rectangular, square, or shaped as a cropped circle, for example. The larger transverse extent of the apertures, as compared to the lens-shaped recesses, provides a safety margin of cured lens resin around each of the yardless lenses and ensures that, even in the presence of at least some degree of imperfections and process tolerances, the full extent of lens resin in each lens-shaped recess is cured such that each yardless lens is fully formed.

Diagram 1016 of FIG. 10 illustrates, by example, the configuration of cured lens resin achieved by step 920. Although step 920 does not include removing uncured lens resin, uncured lens resin is omitted from diagram 1016, for clarity of illustration. Step 920 forms yardless lenses 1080 on side 1052 of transparent substrate 1050. The cross section of each yardless lens 1080 may be circular, non-square rectangular, square, or shaped as a cropped circle, for example. Each yardless lens 1080 is located in a corresponding aperture 1054 of opaque coating 1056. Each yardless lens 1080 includes (a) a yardless lens element 1082 having an optical surface 1084 and (b) a pedestal 1086 between side 1052 and yardless lens element 1082. Pedestal 1086 may be substantially planar, at least outside the perimeter of yardless lens element 1082. Yardless lens element 1082 and pedestal 1086 are integrally formed. The cross section of each yardless lens element 1082 may be circular, non-square rectangular, square, or shaped as a cropped circle, for example. The height of pedestal 1086 is distance 1042 (at least outside the perimeter of yardless lens element 1082), although the height of pedestal 1086 may be less due to process tolerances, without departing from the scope hereof. Yardless lens element 1082 has transverse extent 1065 and pedestal 1086 has transverse extent 1055, such that the perimeter of pedestal 1086 is separated from the perimeter of yardless lens element 1082 by distance 1067, although also here due to process tolerances, the transverse extent of pedestal 1086 may be less than transverse extent 1055. Pedestal 1086 is not the same as yard. In contrast to yard, pedestal 1086 is immediately adjacent yardless lens element 1082, and there is no valley between yardless lens element 1082 and portions of pedestal 1086 located outside the perimeter of yardless lens element 1082. In one embodiment, the height profile of yardless lens 1080 in directions away from the perimeter of lens element 1082 across pedestal 1086 is a substantially monotonic function of the distance from yardless lens element 1082, with no increase in height from the perimeter of yardless lens element 1082. Without departing from the scope hereof, each yardless lens 1080 may be viewed as a yardless lens element 1082' surrounded by a shoulder 1088. It is understood that the height of optical lens surface 1084 above surface 1052 may be less than distance 1042 in some locations within the perimeter of yardless lens element 1082, for example in embodiments of yardless lens element 1082 including a concave portion.

Step 920 may include step 722 of absorbing light in an opaque mold. For example, mold 1060 may be implemented as an opaque polymer mold having a rigid backer, as discussed above for mold 860 in reference to FIG. 8A, such that mold 1060 absorbs light incident thereon in step 920.

Method 900 may further include a step 930 of performing step 730, and optionally step 740, of method 700. In one example, step 930 performs step 730 to produce a yardless lens wafer such as that shown in diagram 1016. In another example, step 930 further performs step 740 to dice this yardless lens wafer to produce a plurality of yardless single-lens assemblies 1018 (see FIG. 10) and/or a plurality of yardless lens array assemblies 1020 (see FIG. 10). Yardless single-lens assembly 1018 is an embodiment of yardless single-lens assembly 818, wherein (a) yardless lens 880 is implemented as yardless lens 1080, (b) portion 850' of substrate 850 is implemented as portion 1050' of transparent substrate 1050, and opaque coating 856 is implemented as opaque coating 1056. Yardless lens array assembly 1020 is an embodiment of yardless lens array assembly 820, wherein (a) each yardless lens 880 is implemented as yardless lens 1080, portion 850" of substrate 850 is implemented as portion 1050″ of transparent substrate 1050, and opaque coating 856 is implemented as opaque coating 1056.

Optionally, step 910 is preceded by step 702 of method 700 adapted to form apertures with greater transverse extent than the lens-shaped recesses of the mold. For example, step 702 may form opaque coating 1056 with apertures 1054.

Although shown in FIG. 10 as being taller than opaque coating 1056, pedestal 1086 need not be as tall as opaque coating 1056.

Figure 11:
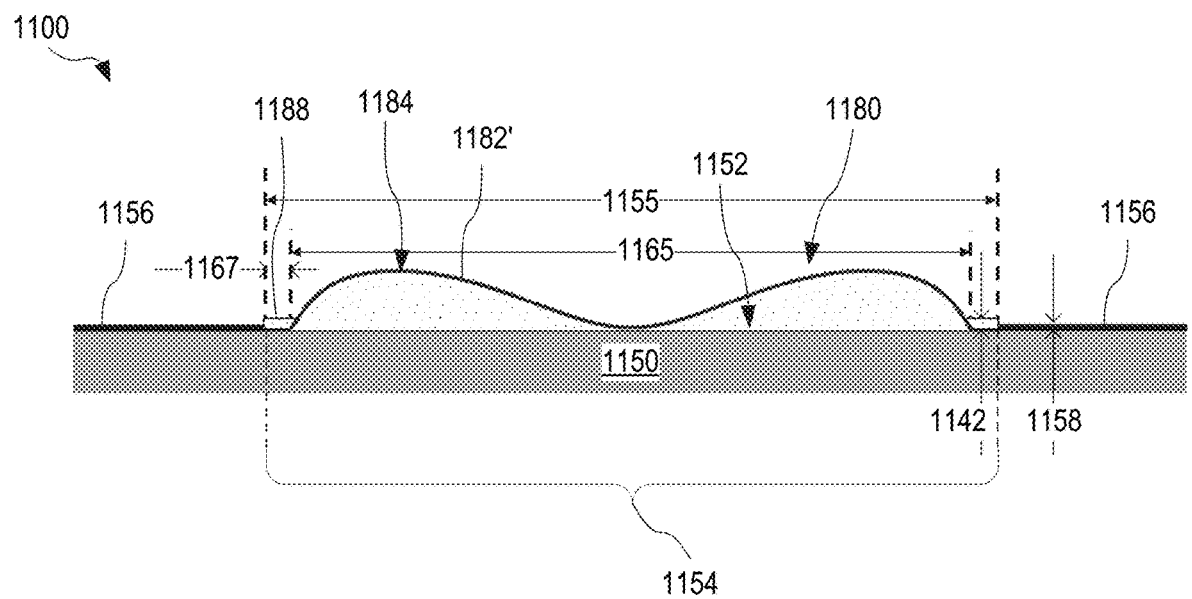
FIG. 11 illustrates a yardless lens assembly with a circular yardless lens, according to an embodiment.

FIG. 11 illustrates one exemplary yardless lens assembly 1100 with a circular yardless lens. Yardless lens assembly 1100 is an embodiment of yardless single-lens assembly 1018. Yardless lens assembly 1100 may be manufactured using method 900 with the inclusion of step 930 implementing both step 730 and 740. Yardless lens assembly 1100 includes a substrate 1150, an opaque coating 1156 deposited on a surface of substrate 1150, and a circular yardless lens 1180. Opaque coating 1156 forms a circular aperture 1154. Yardless lens 1180 is formed on surface 1152 and spans aperture 1154. Yardless lens 1180 is an embodiment of yardless lens 1080, substrate 1150 is an embodiment of portion 1050′ of transparent substrate 1050, and opaque coating 1156 is an embodiment of opaque coating 1056.

Yardless lens 1180 includes a gullwing-shaped yardless lens element 1182′ surrounded by a shoulder 1188. Yardless lens element 1182′ and shoulder 1188 are integrally formed. Yardless lens element 1182′ and shoulder 1188 are embodiments of yardless lens element 1082′ and shoulder 1088. Yardless lens element 1182′ has an optical lens surface 1184 which is an embodiment of optical lens surface 1084. As discussed above in reference to FIG. 10, yardless lens 1180 may be viewed as including a yardless lens element on a pedestal instead of a yardless lens element surrounded by a shoulder, without departing from the scope hereof. Shoulder 1188 has height 1142. Height 1142 is generally less than the height of optical lens surface 1184 above substrate 1150, although in certain embodiments, the height of optical lens surface 1184 above substrate 1150 at the center of yardless lens element 1182′ is less than height 1142. Opaque coating 1156 has height 1158. Although FIG. 11 shows height 1142 as being greater than height 1158, it is understood that height 1142 may be the same as or similar to height 1158. Yardless lens element 1182′ has diameter 1165, and aperture 1154 has diameter 1155. Shoulder 1188 occupies the region outside diameter 1165 and inside diameter 1155. Diameters 1165 and 1155 cooperate to define a shortest distance 1167 between yardless lens 1180 and opaque coating 1156.

In one example (a) diameter 1155 is in the range from 2.5 millimeters to 3.5 millimeters, such as approximately 3.0 millimeters, (b) diameter 1165 is in the range from 2.2 millimeters to 3.2 millimeters, such as approximately 2.7 millimeters, (c) distance 1167 is in the range from 50 to 250 microns, such as approximately 130 microns, and (d) height 1142 is less than 10 microns, such as in the range from 3 to 5 microns.

Figure 12:
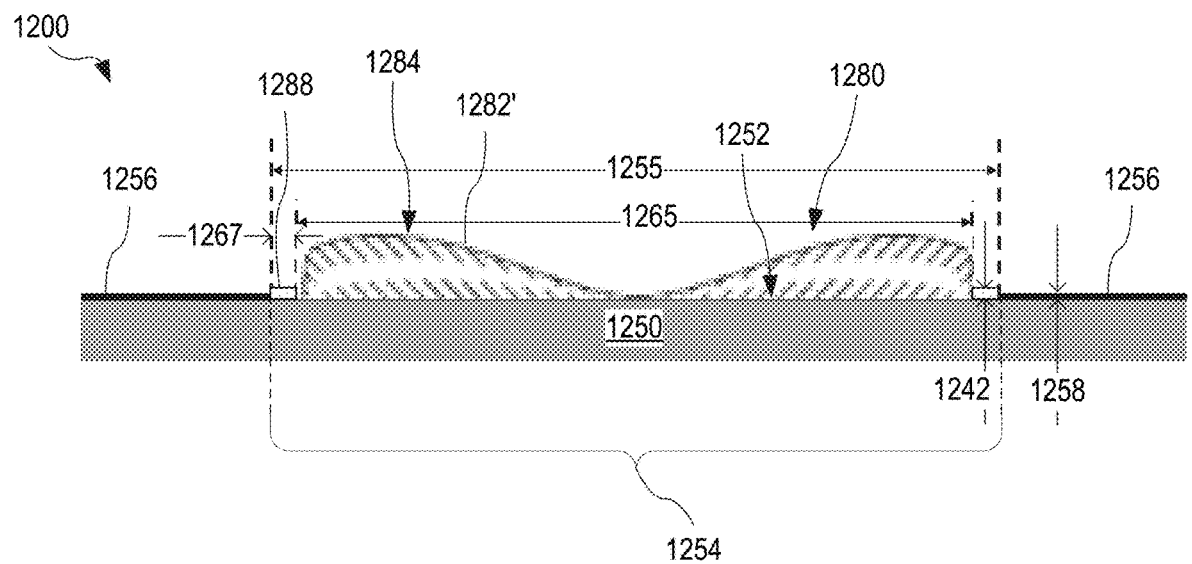
FIG. 12 illustrates a yardless lens assembly with a rectangular yardless lens, according to an embodiment.

FIG. 12 illustrates one exemplary yardless lens assembly 1200 with a non-square rectangular yardless lens. Yardless lens assembly 1200 is an embodiment of yardless single-lens assembly 1018. Yardless lens assembly 1200 may be manufactured using method 900 with the inclusion of step 930 implementing both step 730 and 740. Yardless lens assembly 1200 includes a substrate 1250, an opaque coating 1256 deposited on a surface of substrate 1250, and a non-square rectangular yardless lens 1280. Opaque coating 1256 forms a non-square rectangular aperture 1254. Yardless lens 1280 is formed on surface 1252 and spans aperture 1254. Yardless lens 1280 is an embodiment of yardless lens 1080, substrate 1250 is an embodiment of portion 1050′ of transparent substrate 1050, and opaque coating 1256 is an embodiment of opaque coating 1056.

Yardless lens 1280 includes a gullwing-shaped yardless lens element 1282′ surrounded by a shoulder 1288. Yardless lens element 1282′ and shoulder 1288 are embodiments of yardless lens element 1182′ and shoulder 1188. Yardless lens element 1282′ has an optical lens surface 1284 which is an embodiment of optical lens surface 1084. As discussed above in reference to FIG. 10, yardless lens 1280 may be viewed as including a yardless lens element on a pedestal instead of a yardless lens element surrounded by a shoulder, without departing from the scope hereof. Yardless lens element 1282′ is similar to a cropped embodiment of yardless lens element 1182′. Thus, the transverse extent of each of yardless lens element 1282′, yardless lens 1280, and yardless lens assembly 1200 may be smaller than the transverse extent of yardless lens element 1182′, yardless lens 1180, and yardless lens assembly 1100, respectively. Shoulder 1288 has height 1242. Height 1242 is generally less than the height of optical lens surface 1284 above substrate 1250, although in certain embodiments, the height of optical lens surface 1284 above substrate 1250 at the center of yardless lens element 1282′ is less than height 1242. Opaque coating 1256 has height 1258. Although FIG. 12 shows height 1258 as being greater than height 1242, it is understood that height 1242 generally exceeds height 1258. Yardless lens element 1282′ has side length 1265 along the longest side of the rectangular cross section of yardless lens element 1282′, and aperture 1254 has side length 1255 along the longest side of the rectangular cross section of aperture 1254. Shoulder 1288 occupies the region outside the perimeter of yardless lens element 1282′ and inside aperture 1254. The shortest distance 1267 between yardless lens 1280 and opaque coating 1256 is distance 1267.

In one example (a) side length 1255 is in the range from 2.25 millimeters to 3.25 millimeters, such as approximately 2.75 millimeters, (b) side length 1265 is in the range from 2.1 millimeters to 3.1 millimeters, such as approximately 2.6 millimeters, (c) distance 1267 is in the range from 50 to 250 microns, such as approximately 100 microns, and (d) height 1242 is less than 10 microns, such as in the range from 3 to 5 microns.

Figure 13:
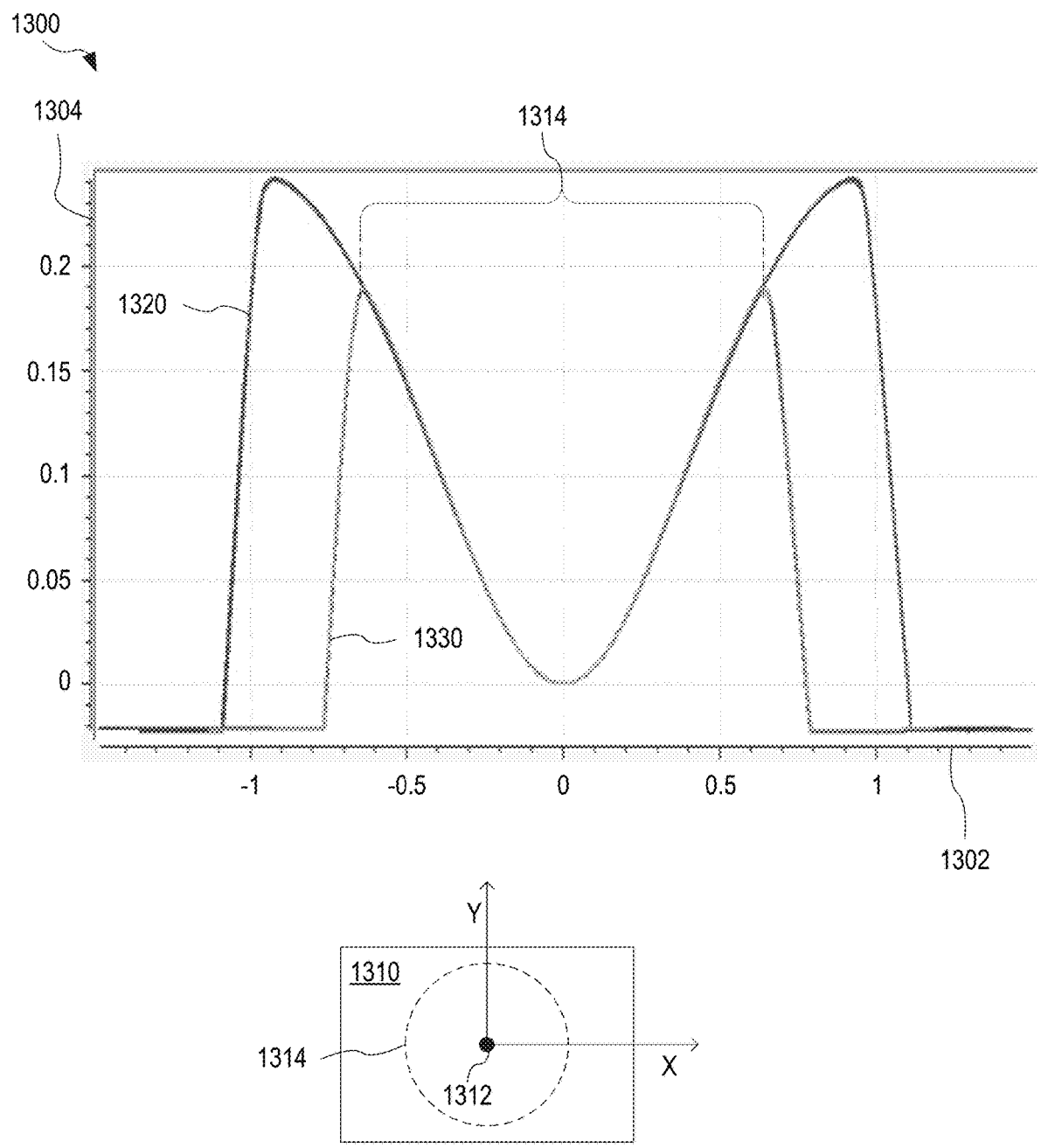
FIG. 13 shows exemplary lens profiles for three instances of a non-square rectangular yardless lens, according to an embodiment.

FIG. 13 shows a plot 1300 of lens profiles for three instances of a non-square rectangular yardless lens 1310 similar to rectangular yardless lens 1280. Plot 1300 shows the height 1304 of yardless lens 1310 (above the substrate on which yardless lens 1310 is formed; similar to the height of yardless lens 1280 above substrate 1250) as a function of position 1302 in units of millimeters. Dataset 1320 of plot 1300 includes three lens profiles taken along the x-direction for the three instances of rectangular yardless lens 1310, respectively. Dataset 1330 of plot 1300 includes three lens profiles taken along the y-direction for the three instances of rectangular yardless lens 1310, respectively. The x-direction is parallel a longer side of rectangular yardless lens 1310, and the y-direction is parallel to a shorter side of rectangular yardless lens 1310. The x-y coordinate system is centered on optical axis 1312 of rectangular yardless lens 1310. The agreement between individual lens profiles of dataset 1320 is excellent, as is the agreement between individual lens profiles of dataset 1330. In addition, within a region 1314 centered about optical axis 1312 and away from the periphery of rectangular lens 1310, lens profiles of dataset 1320 are in excellent agreement with lens profiles of dataset 1330, which is a demonstration of high cylindrical symmetry about optical axis 1312. In contrast, conventional yard-based wafer-level manufacturing processes struggle to produce the same lens profile along the shorter and longer transverse dimensions of rectangular lenses.

Figure 14A:
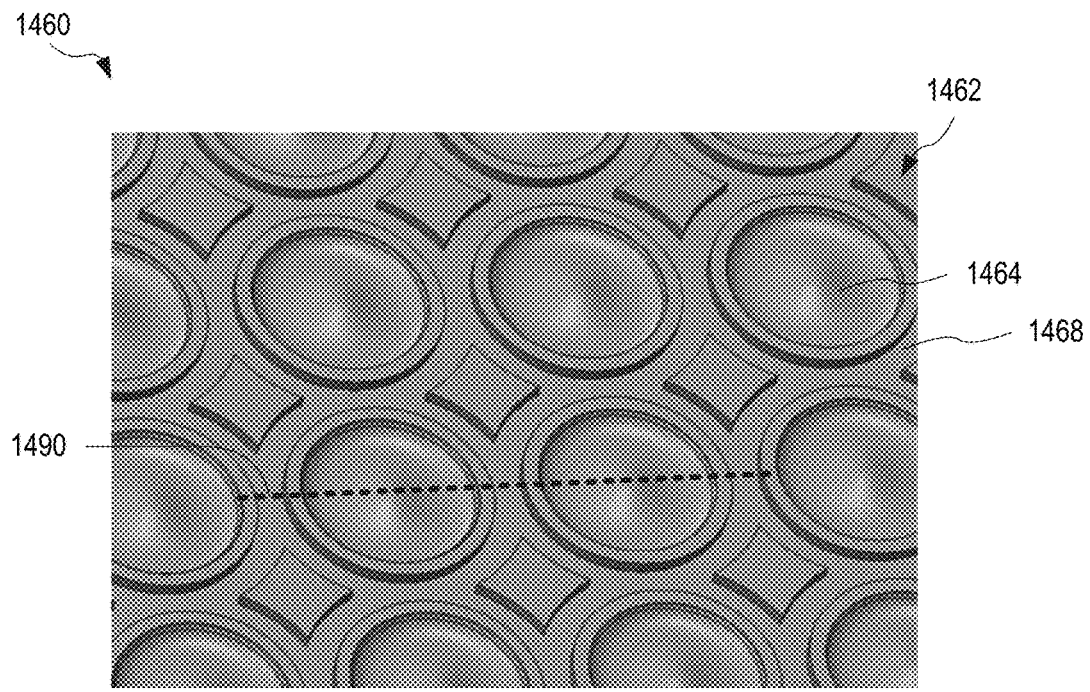
FIGS. 14A and 14B show a mold for making yardless lenses, according to an embodiment.
Figure 14B:
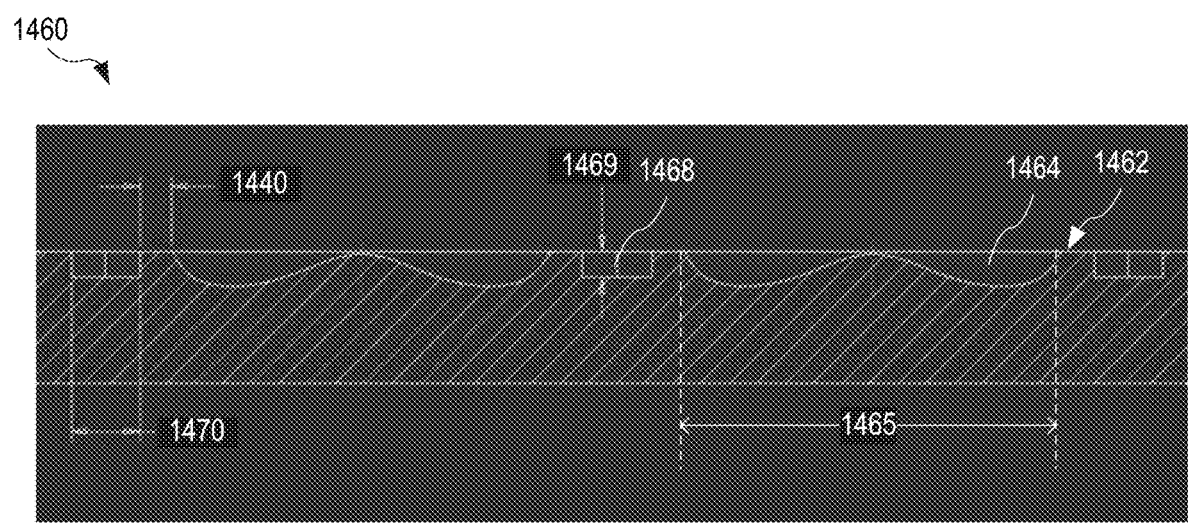

FIGS. 14A and 14B show one exemplary mold 1460 that may be used in any of methods 600, 700, or 900 to produce a yardless lens wafer with circular yardless lenses, such as any one of yardless lens wafer 300, the yardless lens wafer of diagram 816 (implemented with circular yardless lenses 880), or the yardless lens wafer shown in diagram 1016 (implemented with circular yardless lenses 1080). In particular, mold 1460 may be used in method 900 to produce an embodiment of the yardless lens wafer shown in diagram 1016 with each yardless lens 1080 implemented as yardless lens 1180. FIG. 14A is a perspective view of a portion of mold 1460, and FIG. 14B is a cross-sectional side view of a portion of mold 1460 taken along line 1490 of FIG. 14A. FIGS. 14A and 14B are best viewed together.

Mold 1460 has a side 1462 with a plurality of lens-shaped recesses 1464 and an overflow recess network 1468. Side 1462 is an embodiment of side 1052, lens-shaped recesses 1464 are embodiments of lens-shaped recesses 1064, and overflow recess network 1468 is an embodiment of overflow recesses 1468. Each lens-shaped recess 1464 has the profile of a gullwing to mold gullwing-shaped yardless lens elements such as yardless lens element 1182'.

Each lens-shaped recesses 1464 has diameter 1465. Diameter 1465 may be set according to the intended design of the yardless lens elements to be produced therefrom. In one example, diameter 1465 is in the range from a fraction of a millimeter to ten millimeters. Overflow recess network 1468 has depth 1469 and, along line 1490, width 1470. In one example, depth 1469 is in the range between 50 microns and 400 microns (such as approximately 200 microns), and width 1470 is in the range from 100 microns to 1 millimeter (such as approximately 500 microns). The shortest distance 1440 between each lens-shaped recess 1464 and overflow recess network 1468 is distance 1440. In one example distance 1440 is in the range between 50 and 250 microns.

Combinations of Features

Features described above as well as those claimed below may be combined in various ways without departing from the scope hereof. For example, it will be appreciated that aspects of one yardless lens assembly or manufacturing method, described herein, may incorporate or swap features of another yardless lens assembly or manufacturing method described herein. The following examples illustrate possible, non-limiting combinations of embodiments described above. It should be clear that many other changes and modifications may be made to the methods and device herein without departing from the spirit and scope of this invention:

(A1) A wafer-level method for manufacturing yardless lenses may include (a) depositing light-curable lens resin between a mold and a first side of a transparent substrate, wherein the first side of the transparent substrate has an opaque coating with a plurality of apertures respectively aligned with a plurality of lens-shaped recesses of the mold, and (b) exposing a second side of the transparent substrate, facing away from the first side, to light, thereby illuminating portions of the light-curable lens resin aligned with the plurality of apertures to form a respective plurality of yardless lenses.

(A2) The wafer-level method denoted as (A1) may further include, after the step of exposing, removing uncured portions of the light-curable lens resin from the transparent substrate.

(A3) In either or both of the wafer-level methods denoted as (A1) and (A2), the step of exposing may include illuminating the portions of the light-curable lens resin through the transparent substrate and through the apertures, and blocking, using the opaque coating, light propagating through the transparent substrate in direction toward the opaque coating.

(A4) In any of the wafer-level methods denoted as (A1) through (A2), the step of depositing may include accommodating excess amounts of the light-curable lens resin in overflow recesses of the mold.

(A5) In the wafer-level method denoted as (A4), the overflow recesses may be located between the lens-shaped recesses and separated apart from the lens-shaped recesses.

(A6) In either or both of the wafer-level methods denoted as (A4) and (A5), the overflow recesses may be located between the apertures, and the step of exposing may include blocking, using the opaque coating, portions of the light propagating through the transparent substrate in direction toward the overflow recesses such that portions of the light-curable lens resin located in the overflow recesses is not cured.

(A7) In any of the wafer-level methods denoted as (A1) through (A6), each of the recesses may have transverse extent smaller than transverse extent of corresponding one of the apertures, and the step of exposing may include forming the yardless lenses such that optical lens surface of each of the yardless lenses is separated apart from the opaque coating.

(A8) In the wafer-level method denoted as (A7), the step of depositing may include substantially covering the interface between the first side of the substrate and the mold (at least within a simply connected region that includes all of the apertures) with the light-curable lens resin.

(A9) In the wafer-level method denoted as (A8), the step of forming may further include forming the yardless lenses such that each of the yardless lenses includes (a) a pedestal closest to the first side of the substrate and substantially spanning associated one of the apertures and (b) on the pedestal, a yardless lens element characterized by the optical lens surface.

(A10) In the wafer-level method denoted as (A9), the step of forming may include forming the pedestal with thickness less than 10 microns.

(A11) In either or both of the wafer-level methods denoted as (A9) and (A10), for each of the yardless lenses, the shortest distance between the optical lens surface and the opaque coating may be in the range between 50 and 250 microns.

(A12) In any of the wafer-level methods denoted as (A1) through (A11), the mold may be opaque, and the step of exposing may include absorbing, in the mold, portion of the light transmitted by the transparent substrate, the apertures, and the light-curable lens resin to at least reduce scattered-light exposure of portions of the light-curable lens resin location between the first side of the transparent substrate and the mold but not aligned with the apertures.

(A13) In any of the wafer-levels denoted as (A1) through (A12), the step of exposing may include forming the yardless lenses with respective optical lens surfaces of rectangular cross section.

(A14) In the wafer-level method denoted as (A13), each of the apertures may have rectangular cross section.

(A15) In any of the wafer-level methods denoted as (A1) through (A12), the step of exposing may include forming the yardless lenses with respective optical lens surfaces of circular cross section.

(A16) In the wafer-level method denoted as (A15), each of the apertures may have circular cross section.

(B1) A yardless lens assembly may include (a) a transparent substrate, (b) an opaque coating deposited on the transparent substrate, such that the opaque coating forms an aperture on the transparent substrate, and (c) a yardless lens on the transparent substrate in the aperture.

(B2) In the yardless lens assembly denoted as (B1), the transverse extent of the optical lens surface of the yardless lens may be less than the transverse extent of the aperture, such that the perimeter of the optical lens surface is spaced apart from the opaque coating.

(B3) In the yardless lens assembly denoted as (B2), the shortest distance from the perimeter of the optical lens surface to the opaque coating may be in the range between 50 and 250 microns.

(B4) In any of the yardless lens assemblies denoted as (B1) through (B3), the yardless lens may include (i) a pedestal substantially spanning the aperture, and (ii) a yardless lens element on the pedestal and integrally formed therewith, wherein the yardless lens element has an optical lens surface facing away from the transparent substrate, and the transverse extent of the optical lens surface is less than the transverse extent of the aperture, such that perimeter of the optical lens surface is spaced apart from the opaque coating.

(B5) In the yardless lens assembly denoted as (B4), the height of the pedestal may be less than 10 microns.

(B6) In any of the yardless lens assemblies denoted as (B1) through (B5), the perimeter of the optical lens surface of the yardless lenses may be rectangular.

(B7) In any of the yardless lens assemblies denoted as (B1) through (B5), perimeter of optical lens surface of each of the yardless lenses may be circular.

(C1) A yardless lens assembly may include (a) a transparent substrate, (b) an opaque coating deposited on the transparent substrate, such that the opaque coating forms a plurality of apertures on the transparent substrate, and (c) a plurality of yardless lenses on the transparent substrate in the plurality of apertures, respectively.

(C2) In the yardless lens assembly denoted as (C1), the shortest distance between adjacent ones of the yardless lenses may be in the range between 500 and 700 microns.

(C3) In either or both of the yardless lens assemblies denoted as (C1) and (C2), the transverse extent of the optical surface of each of the yardless lenses may be less than the transverse extent of the corresponding one of the apertures such that, for each of the yardless lenses, the perimeter of the optical surface is spaced apart from the opaque coating.

(C4) In any of the yardless lens assemblies denoted as (C1) through (C3), for each of the yardless lenses, the shortest distance from the perimeter of the optical lens surface to the opaque coating may be in the range between 50 and 250 microns.

(C5) In any of the yardless lens assemblies denoted as (C1) through (C4), each of the yardless lenses may include (i) a pedestal substantially spanning corresponding one of the apertures, and (ii) a yardless lens element on the pedestal and integrally formed therewith, wherein the yardless lens element has an optical lens surface facing away from the transparent substrate, and the transverse extent of the optical lens surface is less than the transverse extent of the corresponding one of the apertures such that perimeter of the optical lens surface is spaced apart from the opaque coating.

(C6) In the yardless lens assembly denoted as (C5), for each of the yardless lenses, the height of the pedestal may be less than 10 microns.

(C7) In any of the yardless lens assemblies denoted as (C1) through (C6), the perimeter of the optical lens surface of each of the yardless lenses may be rectangular.

(C8) In any of the yardless lens assemblies denoted as (C1) through (C6), the perimeter of the optical lens surface of each of the yardless lenses may be circular.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A wafer-level method for manufacturing yardless lenses, comprising:
    depositing light-curable lens resin between a mold and a first side of a transparent substrate, the first side of the transparent substrate having an opaque coating with a plurality of apertures respectively aligned with a plurality of lens-shaped recesses of the mold; and
    exposing a second side of the transparent substrate, facing away from the first side, to light, thereby illuminating portions of the light-curable lens resin aligned with the plurality of apertures to form a respective plurality of yardless lenses.

2. The wafer-level method of claim 1, further comprising:
    after the step of exposing, removing uncured portions of the light-curable lens resin from the transparent substrate.

3. The wafer-level method of claim 1, the step of exposing comprising:
    illuminating the portions of the light-curable lens resin through the transparent substrate and through the apertures; and
    blocking, using the opaque coating, light propagating through the transparent substrate in direction toward the opaque coating.

4. The wafer-level method of claim 1, the step of depositing comprising:
    accommodating excess amounts of the light-curable lens resin in overflow recesses of the mold, the overflow recesses being located between the lens-shaped recesses and separated apart from the lens-shaped recesses.

5. The wafer-level method of claim 4,
    in the step of depositing, the overflow recesses being located between the apertures; and
    the step of exposing comprising blocking, using the opaque coating, portions of the light propagating through the transparent substrate in direction toward the overflow recesses such that portions of the light-curable lens resin located in the overflow recesses is not cured.

6. The wafer-level method of claim 1,
    in the step of depositing, each of the recesses having transverse extent smaller than transverse extent of corresponding one of the apertures; and
    the step of exposing comprising forming the yardless lenses such that optical lens surface of each of the yardless lenses is separated apart from the opaque coating.

7. The wafer-level method of claim 6,
    the step of depositing comprising substantially covering interface between the first side of the substrate and the mold, at least within a simply connected region that includes all of the apertures, with the light-curable lens resin; and the step of forming further comprising forming the yardless lenses such that each of the yardless lenses includes (a) a pedestal closest to the first side of the substrate and substantially spanning associated one of the apertures and (b) on the pedestal, a yardless lens element characterized by the optical lens surface.

8. The wafer-level method of claim 7, the step of forming comprising forming the pedestal with thickness less than 10 microns.

9. The wafer-level method of claim 6, in the step of forming and for each of the yardless lenses, shortest distance between the optical lens surface and the opaque coating being in range between 50 and 250 microns.

10. The wafer-level method of claim 1,
in the step of depositing, the mold being opaque; and
the step of exposing comprising absorbing, in the mold, portion of the light transmitted by the transparent substrate, the apertures, and the light-curable lens resin to at least reduce scattered-light exposure of portions of the light-curable lens resin location between the first side of the transparent substrate and the mold but not aligned with the apertures.

11. The wafer-level method of claim 1, the step of exposing comprising forming the yardless lenses with respective optical lens surfaces of rectangular cross section.

12. The wafer-level method of claim 11, in the step of depositing, each of the apertures having rectangular cross section.

13. The wafer-level method of claim 1, the step of exposing comprising forming the yardless lenses with respective optical lens surfaces of circular cross section.

14. The wafer-level method of claim 13, in the step of depositing, each of the apertures having circular cross section.

* * * * *